United States Patent
Lozhkin

(10) Patent No.: US 7,555,078 B2
(45) Date of Patent: Jun. 30, 2009

(54) WIRELESS COMMUNICATION DEVICE

(75) Inventor: Alexander Lozhkin, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 676 days.

(21) Appl. No.: 11/084,594

(22) Filed: Mar. 18, 2005

(65) Prior Publication Data

US 2006/0140300 A1 Jun. 29, 2006

(30) Foreign Application Priority Data

Dec. 28, 2004 (JP) .............................. 2004-378888

(51) Int. Cl.
*H04B 7/10* (2006.01)
(52) U.S. Cl. ................................... 375/347
(58) Field of Classification Search ................. 375/316, 375/322, 324, 325, 346, 347, 259, 260, 267; 455/101, 91, 130, 132; 370/203, 204, 206, 370/207
See application file for complete search history.

(56) References Cited

U.S. PATENT DOCUMENTS

| | | | | |
|---|---|---|---|---|
| 3,633,107 | A * | 1/1972 | Brady | 375/267 |
| 5,710,797 | A * | 1/1998 | Segal et al. | 375/346 |
| 5,715,282 | A * | 2/1998 | Mansouri et al. | 375/350 |
| 5,748,677 | A * | 5/1998 | Kumar | 375/285 |
| 7,302,012 | B2 * | 11/2007 | Kim et al. | 375/316 |
| 2002/0193146 | A1* | 12/2002 | Wallace et al. | 455/562 |
| 2008/0049862 | A1* | 2/2008 | Dean et al. | 375/267 |

FOREIGN PATENT DOCUMENTS

JP 2004-297280 10/2004

OTHER PUBLICATIONS

A. van Zelst. Space Divisionn Multiplexing Algorithms. IEEE MEIeCon May 2000, vol. 3 pp. 1218-1221.
Geert Awater et al. Reduced Complexity Space Division Multiplexing Receivers. IEEE VTC 2000, May 2000.
Alexander N. Lozhkin. Novel Interactive MAP Detector for MIMO Communication. Proc. Of WPMC Sep. 2004.
European Search Report dated Apr. 19, 2006.
Holger Claussen, et al. "Layered Encoding for 16- and 64-QAM Iterative MIMO Receivers" Personal Mobile Communications Conference, Apr. 2003, pp. 511-515, XP002374358.

* cited by examiner

*Primary Examiner*—David C Payne
*Assistant Examiner*—Vineeta S Panwalkar
(74) *Attorney, Agent, or Firm*—Katten Muchin Rosenman LLP

(57) ABSTRACT

A first bit estimate value for a first data stream is determined from a signal $y_0$ received by a first antenna, and a second bit estimate value for the first data stream is determined from a signal $y_1$ received by a second antenna; these are synthesized to determine a synthesized estimate value $\Delta \ln P_0(I)$. Further, a first bit estimate value for a second data stream is determined from a signal received by the first antenna, and bit a second estimate value for the second data stream is determined from a signal received by the second antenna; these bit estimate values are synthesized to determine a synthesized estimate $\Delta \ln P_1(I)$. The bit estimate value of the first data stream is refined using the synthesized estimate value of the second data stream, and based on the synthesized estimate value for the first data stream, "0" or "1" of the bit is decided for the first data stream.

9 Claims, 15 Drawing Sheets

(A)

(B)

(A)

(B)

(A)

(B)

(A)

(B)

(A)

(B)

WIRELESS COMMUNICATION DEVICE

BACKGROUND OF THE INVENTION

This invention relates to a wireless communication device, and in particular relates to a MIMO (Multiple-Input, Multiple-Output)-capable wireless communication device in a transmission system comprising a MIMO configuration.

Among current wireless communication systems, there is increasing interest in space division multiplexing transmission technologies (MIMO transmission systems) in which, by transmitting different data streams in parallel from a plurality of transmission antennas, the transmission capacity can be increased in proportion to the number of transmission antennas.

In a MIMO transmission system, normally signal processing to subtract replicas which occur is employed to remove the interference by other data streams from a data stream of interest (V-BLAST, MSSE-VBLAST, Zero-Forced V-BLAST).

In contrast-with such normal methods, a wireless communication device (turbo receiver device) of this invention performs iterative maximum likelihood estimation. The turb receiver device of this invention exhibits BER results which are extremely close to those for the maximum likelihood decoding (MLD) method, and at the same time alleviates the complexity of calculations.

The turbo receiver device of this invention is based on a maximum posterior probability estimation algorithm. In this turbo receiver device, after nonlinear processing, information derived from one channel refines the estimated maximum posterior probability of another channel, and similarly, information derived from the other channel refines the estimated maximum probability of the one channel.

FIG. 1 shows the configuration of a MIMO system, where TRX is a transmission station and REC is a receiver station.

Data streams $D_0$ to $D_{M-1}$ of the same number as the number of transmission antennas M pass through data modulation, D/A conversion, quadrature modulation, frequency up-conversion, and other processing by respective transmission devices $TRX_0$ to $TRX_{M-1}$, and are transmitted to the respective transmission antennas $ATT_0$ to $ATT_{M-1}$. Signals transmitted from the antennas $ATT_0$ to $ATT_{M-1}$ pass through independent fading channels $h_{nm}$ (m=0 to M−1, n=0 to N−1), and after space division multiplexing, are received by N receiving antennas $ATR_0$ to $ATR_{N-1}$. Signals received by the receiving antennas pass through frequency down-conversion, quadrature detection, A/D conversion and other processing by receiving devices $REC_0$ to $REC_{N-1}$, and received data streams $y_0$ to $y_{N-1}$ are generated. Each of these received data streams is in the form of M multiplexed transmitted data streams, so that by performing signal processing of all received data streams, the transmitted data streams are separated and reproduced.

Algorithms for signal processing to separate transmitted data streams $D_0$ to $D_{M-1}$ from received signals include such linear algorithms as ZF (Zero-Forcing) and MMSE which use the inverse matrix of a channel correlation matrix (see A. van Zelst, "Space Division Multiplexing Algorithms", 10th Mediterranean Electrotechnical Conference 2000, MELECON 2000, Cyprus, May 2000, Vol. 3, pp. 1218-1221), and nonlinear algorithms of which BLAST (Bell Laboratories Layered Space-Time) is representative. In addition, there are also methods, such as MLD (Maximum Likelihood Decoding), which do not use operations on the inverse matrix of a correlation matrix (see Geert Awater, Allert van Zelst and Richard van Nee, "Reduced Complexity Space Division Multiplexing Receivers", in Proc. IEEE VTC 2000, Tokyo, Japan, May 15-18, 2000, Vol. 2, pp. 1070-1074).

ZF (Zero-Forcing) Algorithm

If a transmitted data stream is represented by an M-dimensional complex matrix, and a received data stream by an N-dimensional complex matrix, then the following relation obtains.

$$Y = H \cdot D \quad (1)$$

$$H = \begin{bmatrix} h_{00} \cdot h_{01} \cdots h_{0M-1} \\ h_{10} \cdots h_{1M-1} \\ \cdots \\ h_{N-10} \cdots h_{N-1M-1} \end{bmatrix}$$

$$D = [D_0 \cdot D_1 \cdots D_{M-1}]^{-1}$$

$$Y = [y_0 \cdot y_1 \cdots y_{N-1}]^{-1}$$

The ZF (Zero-Forcing) algorithm uses the following equation to estimate the transmitted data stream.

$$\hat{D} = (H^* \cdot H)^{-1} H^* D = H^+ \cdot Y \quad (2)$$

Here, $H^*H$ is called the channel correlation matrix. $H+$ denotes the pseudo-inverse matrix; in order for this pseudo-inverse matrix to exist, it is necessary that $N \geq M$.

MMSE Algorithm

The MMSE (Minimum Mean Square Error) method is another linear estimation approach in which the transmitted data stream (received data vector) D is estimated based on the received data stream Y. In this MMSE algorithm, the following equation is used to determine the matrix G:

$$\epsilon^2 = E[(D-\hat{D})^*(D-\hat{D})] = [(D-G \cdot Y)^*(D-G \cdot Y)] \quad (3)$$

Then, the following equation is sued to estimate the data stream D.

$$\hat{D} = (\alpha \cdot I + H^* \cdot H)^{-1} H^* \cdot Y \quad (4)$$

Here, $\alpha$ is the noise dispersion, and I is a matrix which depends on G. The ZF algorithm corresponds to the MMSE algorithm when $\alpha=0$.

Decision Feedback Decoding

It is expected that if the most reliable element of the transmitted vector data D is decoded and used to improve decoding of the other elements, performance will be improved. This method is called symbol cancellation, and when combined with the ZF method and MMSE method, is known as ZF-VBL and MSSE-VBL.

MLD Algorithm

The MLD algorithm is a method which does not use operations in the inverse matrix of a correlation matrix, but uses the following equation to estimate the transmitted data stream (transmission vector) D.

$$\hat{D} = \arg\min \|Y - H \cdot D\|^2 \quad (5)$$

Here, if the number of signal constellations of modulated data input to M antennas is Q, then there exist $Q^M$ combinations of transmission vectors D. In QPSK Q=4, in 16QAM Q=16, and in 64QAM Q=64. In the MLD algorithm, candidates (replicas) of the $Q^M$ transmission vectors are generated, and the operation of equation (5) is performed, and the replica the result for which is smallest is estimated to be the input data.

This inventor has proposed an iterative MAP detector which can be applied to MIMO communication systems (Alexander N. Lozhkin, "Novel Interactive MAP Detector for MIMO Communication", Proc. WPMC '04, Sep. 12-15, 2004, Abano Terme, Italy).

FIG. 2 shows simulation results for each of the above reception methods (the ZF-VBL, MSSE-VBL, and MLD methods), indicating the BER (Bit Error Rate) for 2 Eb/N$_0$. In simulations, two transmission antennas and two reception antennas were assumed, QPSK modulation was performed, and signals were transmitted without encoding. FIG. 2 also shows simulations results when there is no interchannel interference (ICI-free), and for REF. The ICI-free points are equivalent to AWGN obtained using simulation software. Points marked as REF are equivalent to data calculated using the following equation.

$$P_{err} = \frac{1}{2} \cdot erfc\left(\sqrt{\frac{E_b}{N_0}}\right), \text{ where } erfc(x) = 1 - erf(x)$$
$$= \frac{2}{\sqrt{\pi}} \int_x^\infty e^{-t^2} dt$$

From the simulation results, there is the problem that the BER for the ZF-VBL and MSSE-VBL methods is substantially higher than the bit error rate for the MLD method. On the other hand, although the error rate for the MLD method is low, there are the problems that the volume of computations required is huge, and that the volume of computations increases exponentially as the number of antennas is increased.

The conventional technology described in the reference by Lozhkin above proposes a method which lower the bit error rate and reduces the volume of computations, but with insufficient results.

SUMMARY OF THE INVENTION

Hence an object of the invention is to further extend the conventional technology described in the reference by Lozhkin above, to provide a wireless communication device with a lower bit error rate, and for which the volume of computation can be reduced.

According to this invention, the above object is achieved by means of a wireless device, comprising a plurality of receiving antennas which receive signals output from transmitting antennas over a plurality of transmission paths having different propagation characteristics, and receivers provided for each of the plurality of antennas, and in which the receivers provided for the plurality of antennas separate signals received by the receiving antennas into quadrature components, process the received signals, and perform data conversion between the receivers.

In the above wireless device, calculations are repeated a plurality of times to determine a bit estimate value from signals received by the receivers provided for each of the plurality of antennas using the receiving antennas.

In the above wireless device, the receivers provided for each of the plurality of antennas comprise a nonlinear processing circuit-having as a transfer function an amplitude limiter, and a decision circuit which performs bit decisions for signals received from the receiving antenna; when the decision circuit performs bit decisions, a bit estimate value for adjacent data streams after nonlinear processing is used.

In the above wireless device, the receivers provided for each of the plurality of antennas comprise a nonlinear processing circuit having as a transfer function an amplitude limiter, and a decision circuit which performs bit decisions for signals received from the receiving antenna; when the decision circuit performs bit decisions, a bit estimate value for the same data stream after nonlinear processing is used.

In the above wireless device, of the receivers provided for the plurality of antennas, a first bit estimate value determined from a signal received by a first receiver provided for a first receiving antenna, and a second bit estimate value determined from a signal received by a second receiver provided for a second receiving antenna, are synthesized to perform final decision processing.

In the above wireless device, the receivers provided for each of the plurality of antennas comprise a nonlinear processing circuit having as a transfer function an amplitude limiter, and sets the limit level of the nonlinear processing circuit to a value which depends on the signal-to-noise ratio and on transmitted signal energy differences.

In the above wireless device, the receivers provided for each of the plurality of antennas comprise a nonlinear processing circuit having as a transfer function an amplitude limiter and a decision circuit which performs bit decisions for signals received by the receiving antenna, and when performing bit decisions for a received signal, the decision circuit uses the soft decision result for adjacent data after nonlinear processing in the nonlinear processing circuit.

By means of this invention, the bit estimate values are determined by receivers connected to a plurality of antennas (for example, first and second antennas), and one bit estimate value is refined using the other bit estimate value, so that BER characteristics can be improved, and moreover the volume of computations can be reduced by using nonlinear processing circuitry, and in addition the configuration can be simplified. By increasing the number of iterated refinements, the BER characteristic can be further improved.

Other features and advantages of the present invention will be apparent from the following description taken in conjunction with the accompanying drawings.

DESCRIPTION OF THE PREFERRED EMBODIMENTS

A first bit estimate value of a first data stream is determined from the signals received by a first antenna, and a second bit estimate value of the first data stream is determined from signals received by a second antenna; these bit estimate values are then synthesized to determine a synthesized estimate value. Also, a first bit estimate value of a second data stream is determined from the signals received by a first antenna, and a second bit estimate value of the second data stream is determined from signals received by a second antenna; these bit estimate values are then synthesized to determine a synthesized estimate value. The bit estimate value for the first data stream is then refined using the synthesized estimate value for the second data stream, and based on the synthesized estimate value for the first data stream, the first data stream bits are decided. Also, the bit estimate value for the second data stream is refined using the synthesized estimate value for the first data stream, and based on the synthesized estimate value for the second data stream, bits for the second data stream are decided. Hereinafter, "bit estimate" is used instead of the wording of "bit estimate value".

Embodiment 1

Figure 3:
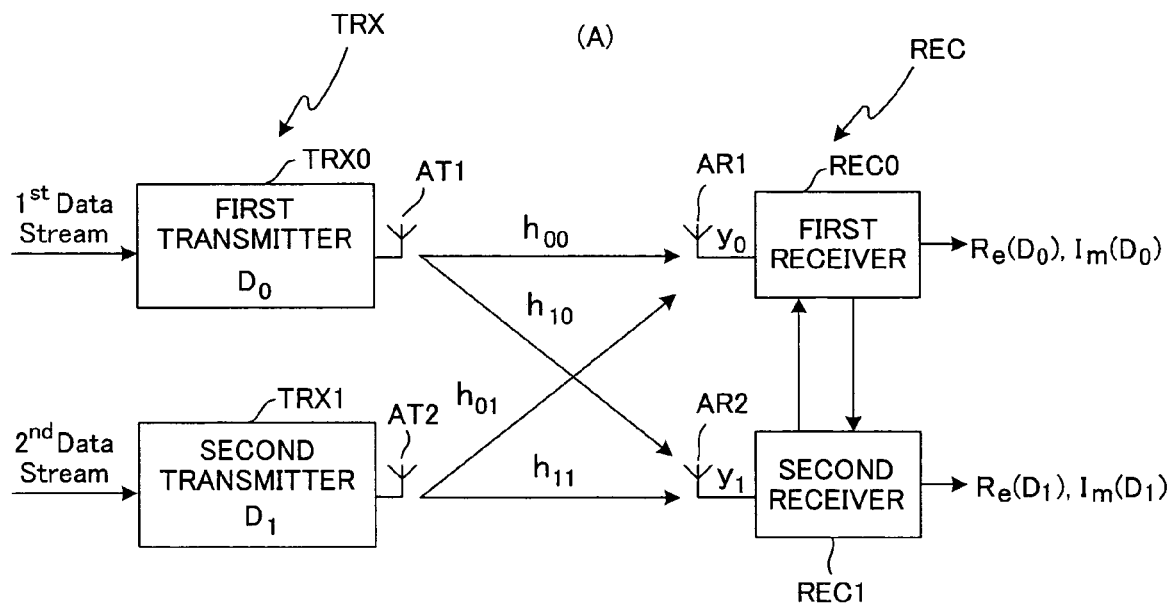
FIG. 3 shows the configuration of a MIMO transmission system when a transmission station and reception station each comprise two antennas.
Figure 3:
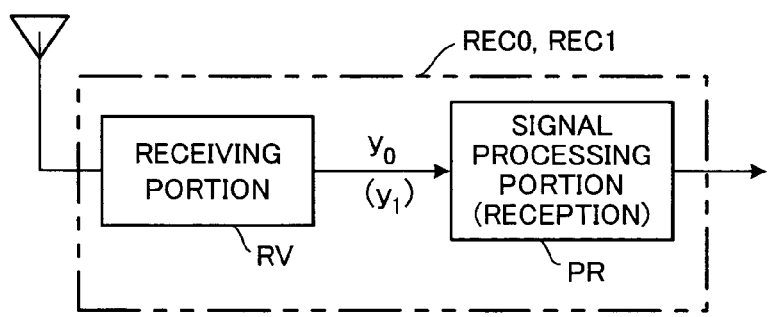

FIG. 3 shows the configuration of a MIMO transmission system when a transmission station and reception station each comprise two antennas. As shown in (A), the transmission station TRX comprises two transmitters TRX0, TRX1 and two transmission antennas AT1, AT2, and the reception station REC comprises two receiving antennas AR1, AR2 and two receivers REC0, REC1. As shown in (B), each of the receivers REC0, REC1 comprises a reception portion RV and a signal processing portion PR; the reception portion RV performs data modulation, D/A conversion, quadrature modulation, frequency up-conversion, and other processing, and inputs signals $y_0$, $y_1$ to the signal processing portion PR; the signal processing portion PR performs data stream bit decisions. The explanation below is based on (A) in FIG. 3.

Each of the transmitters TRX0, TRX1 subjects information symbols $D_i$ (i=0, 1) to QPSK or BPSK modulation, and transmits the signals. The first transmitter TRX0 transmits the first data stream, and the second transmitter TRX1 transmits the second data stream.

Information symbols $D_i$ (i=0, 1) comprising the first and second data streams have a real part $Re(D_i)$ and an imaginary part $Im(D_i)$. Hence $D_i=(d_{Re},d_{Im})$, $d_{Re}=Re(D_i)$, and $d_{Im}=Im(D_i)$. When QPSK is used, an information symbol $D_i$ is one of four possible signals $S_j^*(t)$ (j=0, 1, 2, 3). The number of j in the signal $S_j^*(t)$ depends on the pair of data bits $d_{Re}=Re(D_i)$ and $d_{Im}=Im(D_i)$, as indicated in Table 1.

TABLE 1

| j | Signal | D | $d_{Re} = Re(D_i)$ | $d_{Im} = Im(D_i)$ |
|---|--------|---|-----|-----|
| 0 | $S_0^*(t)$ | (+1 + 1) | (+1) | (+1) |
| 1 | $S_1^*(t)$ | (+1 − 1) | (+1) | (−1) |
| 2 | $S_2^*(t)$ | (−1 + 1) | (−1) | (+1) |
| 3 | $S_3^*(t)$ | (−1 − 1) | (−1) | (−1) |

Here it should be noted that for signals $S_j^*(t)$ the relations $S_0^*(t)=-S_3^*(t)$ and $S_1^*(t)=-S_2^*(t)$ obtain. If QPSK transmission is used, the received signals $y_0(t)$, $y_1(t)$ in the first and second receivers REC0, REC1 can be represented as linear combinations of signals transmitted by the transmitters TRX0, TRX1 according to the following equation.

$$y_0(t)=h_{00} \cdot D_0 + h_{01} \cdot D_1 \quad (6)$$

$$y_1(t)=h_{10} \cdot D_0 + h_{11} \cdot D_1 \quad (6)'$$

New notation $S_{ij}^*(t)$ for transmitted signals is introduced. The index i in $S_{ij}^*(t)$ indicates the number (0, 1) of the transmitter; the index j indicates the information symbol $S_j^*(t)$ (j=0, 1, 2, 3) in Table 1 transmitted by the first transmitter.

Input to each of the receivers REC0, REC1 can be any of 16 possible signals, resulting from combination of the transmission information signals $D_i(0, 1)$ of the first and second transmitters TRX1, TRX2. Table 2 indicates all possible signals for input to the first receiver REC0; Table 3 indicates all possible signals for input to the second receiver REC1.

TABLE 2

| $S_j(t)$ | $D_0$ | $D_1$ |
|---|---|---|
| $S_0 = h_{00} \cdot S_{00}^* + h_{01} \cdot S_{10}^*$ | (+1 + 1) | (+1 + 1) |
| $S_1 = h_{00} \cdot S_{00}^* + h_{01} \cdot S_{11}^*$ | (+1 + 1) | (+1 − 1) |
| $S_2 = h_{00} \cdot S_{00}^* + h_{01} \cdot S_{12}^*$ | (+1 + 1) | (−1 + 1) |
| $S_3 = h_{00} \cdot S_{00}^* + h_{01} \cdot S_{13}^*$ | (+1 + 1) | (−1 − 1) |
| $S_4 = h_{00} \cdot S_{01}^* + h_{01} \cdot S_{10}^*$ | (+1 − 1) | (+1 + 1) |
| $S_5 = h_{00} \cdot S_{01}^* + h_{01} \cdot S_{11}^*$ | (+1 − 1) | (+1 − 1) |
| $S_6 = h_{00} \cdot S_{01}^* + h_{01} \cdot S_{12}^*$ | (+1 − 1) | (−1 + 1) |
| $S_7 = h_{00} \cdot S_{01}^* + h_{01} \cdot S_{13}^*$ | (+1 − 1) | (−1 − 1) |
| $S_8 = h_{00} \cdot S_{02}^* + h_{01} \cdot S_{10}^*$ | (−1 + 1) | (+1 + 1) |
| $S_9 = h_{00} \cdot S_{02}^* + h_{01} \cdot S_{11}^*$ | (−1 + 1) | (+1 − 1) |
| $S_{10} = h_{00} \cdot S_{02}^* + h_{01} \cdot S_{12}^*$ | (−1 + 1) | (−1 + 1) |
| $S_{11} = h_{00} \cdot S_{02}^* + h_{01} \cdot S_{13}^*$ | (−1 + 1) | (−1 − 1) |
| $S_{12} = h_{00} \cdot S_{03}^* + h_{01} \cdot S_{10}^*$ | (−1 − 1) | (+1 + 1) |
| $S_{13} = h_{00} \cdot S_{03}^* + h_{01} \cdot S_{11}^*$ | (−1 − 1) | (+1 − 1) |
| $S_{14} = h_{00} \cdot S_{03}^* + h_{01} \cdot S_{12}^*$ | (−1 − 1) | (−1 + 1) |
| $S_{15} = h_{00} \cdot S_{03}^* + h_{01} \cdot S_{13}^*$ | (−1 − 1) | (−1 − 1) |

TABLE 3

| $S_j(t)$ | $D_0$ | $D_1$ |
|---|---|---|
| $S_{16} = h_{10} \cdot S_{00}^* + h_{11} \cdot S_{10}^*$ | (+1 + 1) | (+1 + 1) |
| $S_{17} = h_{10} \cdot S_{00}^* + h_{11} \cdot S_{11}^*$ | (+1 + 1) | (+1 − 1) |
| $S_{18} = h_{10} \cdot S_{00}^* + h_{11} \cdot S_{12}^*$ | (+1 + 1) | (−1 + 1) |
| $S_{19} = h_{10} \cdot S_{00}^* + h_{11} \cdot S_{13}^*$ | (+1 + 1) | (−1 − 1) |
| $S_{20} = h_{10} \cdot S_{01}^* + h_{11} \cdot S_{10}^*$ | (+1 − 1) | (+1 + 1) |
| $S_{21} = h_{10} \cdot S_{01}^* + h_{11} \cdot S_{11}^*$ | (+1 − 1) | (+1 − 1) |
| $S_{22} = h_{10} \cdot S_{01}^* + h_{11} \cdot S_{12}^*$ | (+1 − 1) | (−1 + 1) |
| $S_{23} = h_{10} \cdot S_{01}^* + h_{11} \cdot S_{13}^*$ | (+1 − 1) | (−1 − 1) |
| $S_{24} = h_{10} \cdot S_{02}^* + h_{11} \cdot S_{10}^*$ | (−1 + 1) | (+1 + 1) |
| $S_{25} = h_{10} \cdot S_{02}^* + h_{11} \cdot S_{11}^*$ | (−1 + 1) | (+1 − 1) |
| $S_{26} = h_{10} \cdot S_{02}^* + h_{11} \cdot S_{12}^*$ | (−1 + 1) | (−1 + 1) |
| $S_{27} = h_{10} \cdot S_{02}^* + h_{11} \cdot S_{13}^*$ | (−1 + 1) | (−1 − 1) |
| $S_{28} = h_{10} \cdot S_{03}^* + h_{11} \cdot S_{10}^*$ | (−1 − 1) | (+1 + 1) |

TABLE 3-continued

| $S_j(t)$ | $D_0$ | $D_1$ |
|---|---|---|
| $S_{29} = h_{10} \cdot S_{03}{}^* + h_{11} \cdot S_{11}{}^*$ | (−1 − 1) | (+1 − 1) |
| $S_{30} = h_{10} \cdot S_{03}{}^* + h_{11} \cdot S_{12}{}^*$ | (−1 − 1) | (−1 + 1) |
| $S_{31} = h_{10} \cdot S_{03}{}^* + h_{11} \cdot S_{13}{}^*$ | (−1 − 1) | (−1 − 1) |

(a) Determination of the Real Part $d_{Re}$=Re($D_0$) of the Symbol $D_0$ Received by the First Receiver REC0

Figure 1:
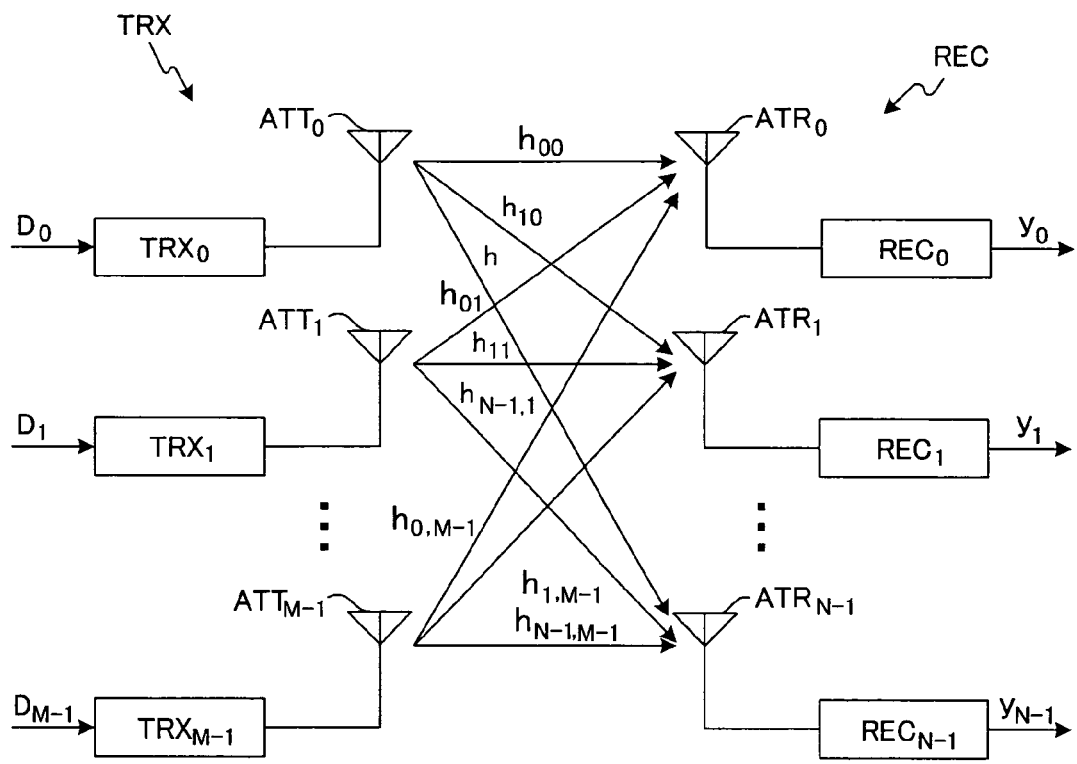
FIG. 1 shows the configuration of a MIMO system.
Figure 2:
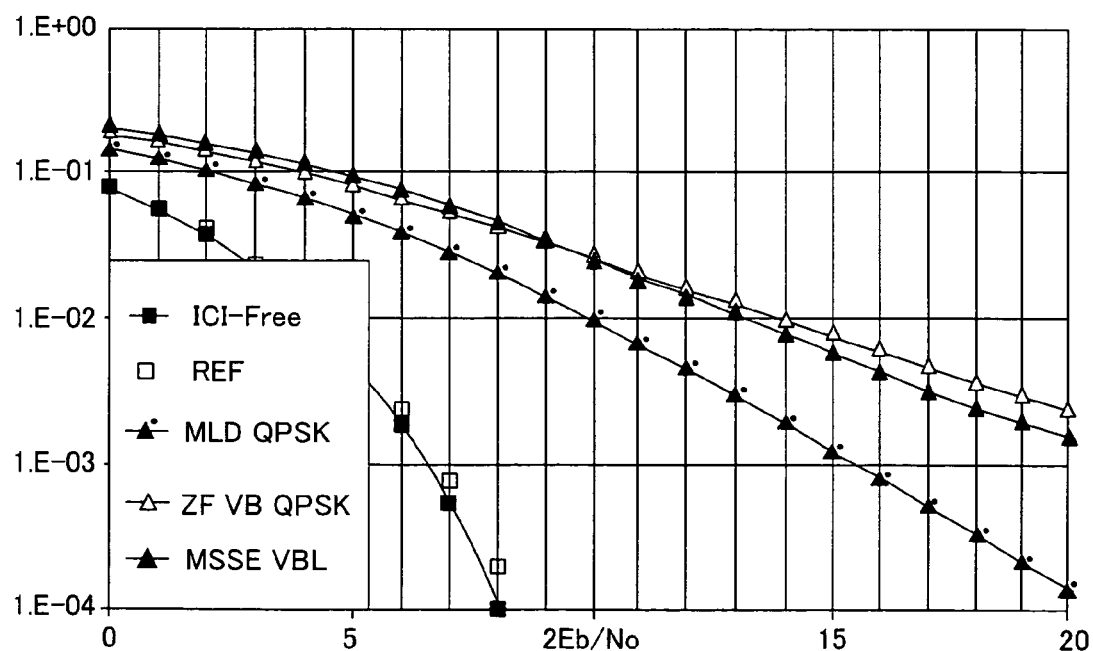
FIG. 2 shows simulation results (BER characteristics) for different reception methods (ZF-VBL method, MSSE-VBL method, MLD method)

From FIG. 2, the posterior probability that the ith receiver will receive signal $S_j$, using Bayes' mixed rule, is given by the following equation.

$$P_i[d_{Re}/y(t)] = P_i[S_j/y(t)] \tag{7}$$

$$= \frac{P_a(S_j) \cdot P(y(t)/S_j)}{P(y(t))}$$

$$\equiv k_0 \cdot P_a(S_j) \cdot \exp\left\{-\frac{1}{N_0}\int_0^T [y_0(t) - S_j]^2 dt\right\}$$

Here $k_0$ is a normalization factor, j is the signal number, with j=0, 1, 2, . . . , 15, y(t) is the signal synthesized from the signal train and the Gaussian white noise n(t) having spectral power intensity $N_0$ (y(t)=$S_j$+n(t)), $P_i(S_j/y(t))$ is the posterior probability of receiving signal $S_j(t)$ in the ith receiver (the probability that the received signal y(t) is $S_j(t)$), $P_i(d_{Re}/y(t))$ is the posterior probability of receiving $d_{Re}$ in the ith receiver (the probability that the received signal y(t) is $d_{Re}$), $P_a(S_j)$ is the prior probability that a transmitted/received signal is $S_j(t)$, $P(y(t)/S_j)$ is a conditional probability, which is the probability, when a received word is y(t), that the sent code word was $S_j$, and P(y(t)) is the probability that y(t) is received.

The probability P(y(t)) in equation (7) is common to all decision candidates, and so can be ignored. What is necessary for decision of received information is discovery of candidate information signals which maximize the numerator or the right side of equation (7).

From Table 2, the probabilities that the first receiver REC0 receives $d_{Re}$=+1 and $d_{Re}$=−1 are given, respectively, by $$P(d_{Re} = +1) = \tag{8}$$
$$P_a(S_0)P(S_0) + P_a(S_1)P(S_1) + P_a(S_2)P(S_2) + P_a(S_3)P(S_3) +$$
$$P_a(S_4)P(S_4) + P_a(S_5)P(S_5) + P_a(S_6)P(S_6) + P_a(S_7)P(S_7)$$

$$P(d_{Re} = -1) = \tag{8}'$$
$$P_a(S_8)P(S_8) + P_a(S_9)P(S_9) + P_a(S_{10})P(S_{10}) + P_a(S_{11})P(S_{11}) +$$
$$P_a(S_{12})P(S_{12}) + P_a(S_{13})P(S_{13}) + P_a(S_{14})P(S_{14}) + P_a(S_{15})P(S_{15})$$

In equations (7), (8) and (8)', $P_a(S_j)$ is the prior probability of receiving $S_j(t)$, and $P_i(S_j/y(t))$ is the posterior probability of receiving the signal $S_j(t)$ in the ith receiver (the probability that the received signal y(t) is $S_j(t)$); from Table 2, the prior probability $P_a(S_j)$ (j=0, 1, 2, . . . , 15) is as given below.

$P_a(S_0)=P_0(+1+1)P_1(+1+1)$  $P_a(S_4)=P_0(+1-1)P_1(+1+1)$ $P_a(S_1)=P_0(+1+1)P_1(+1-1)$  $P_a(S_5)=P_0(+1-1)P_1(+1-1)$ $P_a(S_2)=P_0(+1+1)P_1(-1+1)$  $P_a(S_6)=P_0(+1-1)P_1(-1+1)$ $P_a(S_3)=P_0(+1+1)P_1(-1-1)$  $P_a(S_7)=P_0(+1-1)P_1(-1-1)$ $P_a(S_8)=P_0(-1+1)P_1(+1+1)$  $P_a(S_{12})=P_0(-1-1)P_1(+1+1)$ $P_a(S_9)=P_0(-1+1)P_1(+1-1)$  $P_a(S_{13})=P_0(-1-1)P_1(+1-1)$ $P_a(S_{10})=P_0(-1+1)P_1(-1+1)$  $P_a(S_{14})=P_0(-1-1)P_1(-1+1)$ $P_a(S_{11})=P_0(-1+1)P_1(-1-1)$  $P_a(S_{15})=P_0(-1-1)P_1(-1-1)$ \hfill (9)

In the above equation, the index of P indicates the number of the transmitter, and is 0 or 1. Substituting equation (9) into equations (8) and (8)', the probabilities that the first receiver REC0 receives $d_{Re}$=+1 and $d_{Re}$=−1 are respectively $$P(d_{Re} = +1) = P_0(+1+1)\{P_1(+1+1)P(S_0) + \tag{10}$$
$$P_1(+1-1)P(S_1) + P_1(-1+1)P(S_2) + P_1(-1-1)P(S_3)\} +$$
$$P_0(+1-1)\{P_1(+1+1)P(S_4) + P(+1-1)P(S_5) +$$
$$P_1(-1+1)P(S_6) + P_1(-1-1)P(S_7)\}$$

$$P(d_{Re} = -1) = P_0(-1+1)\{P_1(+1+1)P(S_8) + P_1(+1-1)P(S_9) + \tag{11}$$
$$P_1(-1+1)P(S_{10}) + P_1(-1-1)P(S_{11})\} +$$
$$P_0(-1-1)\{P_1(+1+1)P(S_{12}) + P(+1-1)P(S_{13}) +$$
$$P_1(-1+1)P(S_{14}) + P_1(-1-1)P(S_{15})\}$$

The sign of the real part $d_{Re}$ of a received information symbol can be determined from the result of comparing prior probabilities, or from comparison of their logarithm with a threshold. That is, by comparing the magnitudes of the probabilities that the real part $d_{Re}$ of a received information symbol is 1 and 0, or by comparing the difference in the logarithms thereof with a threshold, the sign (0 or 1) of the real part $d_{Re}$ of the received information symbol can be determined. Thus the sign of the real part $d_{Re}$ of the received information symbol is determined by $$\frac{P(d_{Re} = +1/y(t))}{P(d_{Re} = -1/y(t))} \gtreqless 1 \text{ or} \tag{12}$$

$$\ln P(d_{Re} = +1/y(t)) - \ln P(d_{Re} = -1/y(t)) \gtreqless 0$$

Equation (12) is a determination rule (decision rule) for determining the sign of the real part $d_{Re}$ of the received information symbol.

Here, $$\ln\{\exp(A)+\exp(B)+\exp(C)+\exp(D)\}=\text{Lin}+N\text{Lin} \tag{13}$$

obtains, where, $$Lin = 0.25[(A+B)+(C+D)] + \ln(2) + \tag{13a}$$
$$0.5[\ln\{\cosh[0.5(A-B)]\} + \ln\{\cosh[0.5(C-D)]\} + \ln(2)$$

$$Arg = 0.25[(A+B)-(C+D)] + \tag{13b}$$
$$0.5[\ln\{\cosh[0.5(A-B)]\} - \ln\{\cosh[0.5(C-D)]\}]$$

$$NLin = \ln\{\cosh[0.5 Arg]\} \tag{13c}$$

In consideration of the algebraic identity of the following equation, $$\ln(e^X + e^Y) = \frac{X+Y}{2} + \ln 2 + \ln\cosh\left(\frac{X-Y}{2}\right) \quad (13d)$$

equation (10) can be rewritten as $$P(d_{Re} = +1) = P_0(+1+1)\{P_1(+1+1)P(S_0) + \\ P_1(+1-1)P(S_1) + P_1(-1+1)P(S_2) + P_1(-1-1)P(S_3)\} + \\ P_0(+1-1)\{P_1(+1+1)P(S_4) + P_1(+1-1)P(S_5) + \\ P_1(-1+1)P(S_6) + P_1(-1-1)P(S_7)\} \quad (13e)$$

and $$\ln\{P(d_{Re} = +1)\} = \\ 0.5(\ln P_0(+1+1) + \ln(P_1(+1+1)P(S_0) + P_1(+1-1)P(S_1) + \\ P_1(-1+1)P(S_2) + P_1(-1-1)P(S_3))) + \\ 0.5(\ln P_0(+1-1) + \ln(P_1(+1+1)P(S_4) + P_1(+1-1)P(S_5) + \\ P_1(-1+1)P(S_6) + P_1(-1-1)P(S_7))) + \\ \ln\{\cosh[0.5(\ln P_0(+1+1) + \ln(P_1(+1+1)P(S_0) + \\ P_1(+1-1)P(S_1) + P_1(-1+1)P(S_2) + \\ P_1(-1-1)P(S_3))) - \\ 0.5(\ln P_0(+1-1) + \ln(P_1(+1+1)P(S_4) + P_1(+1-1) \\ P(S_5) + P_1(-1+1)P(S_6) + P_1(-1-1)P(S_7)))]\} \quad (13f)$$

Further, $$\ln P_0(+1+1) - \ln P_0(+1-1) = \ln P_0(Q=+1) - \ln P_0(Q=-1) = \\ \Delta \ln P_0(Q) \quad (13g)$$

Similarly rewriting equation (11) gives $$P(d_{Re} = -1) = P_0(-1+1)\{P_1(+1+1)P(S_8) + P_1(+1-1)P(S_9) + \\ P_1(-1+1)P(S_{10}) + P_1(+1+1)P(S_{11})\} + \\ P_0(+1-1)\{P_1(+1+1)P(S_{12}) + P_1(+1-1)P(S_{13}) + \\ P_1(-1+1)P(S_{14}) + P_1(-1-1)P(S_{15})\} \quad (13h)$$

Further, $$\ln\{P(d_{Re} = -1)\} = \\ 0.5(\ln P_0(+1+1) + \ln(p_1(+1+1)P(S_8) + P_1(+1-1)P(S_9) + \\ P_1(-1+1)P(S_{10}) + P_1(-1-1)P(S_{11}))) + \\ 0.5(\ln P_0(+1-1) + \ln(P_1(+1+1)P(S_{12}) + P_1(+1-1)P(S_{13}) + \\ P_1(-1+1)P(S_{14}) + P_1(-1-1)P(S_{15}))) + \\ \ln\left\{\cosh\begin{bmatrix} 0.5(\ln P_0(+1+1) + \ln(p_1(+1+1)P(S_8) + \\ P_1(+1-1)P(S_9) + P_1(-1+1)P(S_{10}) + \\ P_1(-1-1)P(S_{11})) - \\ 0.5(\ln P_0(+1-1) + \ln(P_1(+1+1)P(S_{12}) + \\ P_1(+1-1)P(S_{13}) + P_1(-1+1)P(S_{14}) + \\ P_1(-1-1)P(S_{15}))) \end{bmatrix}\right\} \quad (13i)$$

Also, $$\ln P_0(+1+1) - \ln P_0(+1-1) = \ln P_0(Q=+1) - \ln P_0(Q=-1) = \\ \Delta \ln P_0(Q) \quad (13j)$$

Here, if it is assumed that $$P_0(+1+1)P(S_0)=A, \; P_0(+1-1)P(S_1)=B,$$

$$P_0(-1+1)P(S_2)=C, \; P_0(-1-1)P(S_3)=D \quad (13k)$$

then the following obtains for the first member of equation (10):

$$(\ln(P_0(+1+1)P(S_0) + P_0(+1-1)P(S_1) + P_0(-1+1)P(S_2) + P_0(-1-1)P(S_3))) = \\ 0.25(\ln P_0(+1+1) + \ln P(S_0) + \ln P_0(+1-1) + \ln P(S_1) + \ln P_0(-1+1) + \ln P(S_2) + \\ \ln P_0(-1-1) + \ln P(S_3)) + \ln 2 + \\ 0.5(\ln\{\cosh[0.5(\ln P_0(+1+1) + \ln P(S_0) - \ln P_0(+1-1) - \ln P(S_1))]\}) + \\ 0.5(\ln\{\cosh[0.5(\ln P_0(-1+1) + \ln P(S_2) - \ln P_0(-1-1) - \ln P(S_3))]\}) + \ln 2 + \\ \ln\left\{\cosh\left[0.5\begin{pmatrix} 0.25\begin{pmatrix} \ln P_0(+1+1) + \ln P(S_0) + \ln P_0((+1-1) + \ln P(S_1) - \\ \ln P_0(-1+1) - \ln P(S_2) - \ln P_0(-1-1) - \ln P(S_3) \end{pmatrix} + \\ 0.5(\ln\{\cosh[0.5(\ln P_0(+1+1) + \ln P(S_0) - \ln P_0(+1-1) - \ln P(S_1))]\}) - \\ 0.5(\ln\{\cosh[0.5(\ln P_0(-1+1) + \ln P(S_2) - \ln P_0(-1-1) - \ln P(S_3))]\}) \end{pmatrix}\right]\right\} \quad (13m)$$

Further, upon taking into account $$\ln P_0(+1+1) - \ln P_0(+1-1) = \ln P_0(Q=+1) - \ln P_0(Q=-1) = \\ \Delta \ln P_0(Q) \quad (13n)$$

$$\ln P_0(-1+1) - \ln P_0(-1-1) = \ln P_0(Q=+1) - \ln P_0(Q=-1) = \\ \Delta \ln P_0(Q) \quad (13p)$$

the above equations can be expressed as follows.

$$(\ln(P_0(+1+1)P(S_0) + P_0(+1-1)P(S_1) + P_0(-1+1)P(S_2) + P_0(-1-1)P(S_3))) = \quad (13q)$$
$$0.25(\ln P_0(+1+1) + \ln P(S_0) + \ln P_0(+1-1) +$$
$$\ln P(S_1) + \ln P_0(-1+1) + \ln P(S_2) + \ln P_0(-1-1) + \ln P(S_3)) +$$
$$\ln 2 + 0.5(\ln\{\cosh [0.5(\Delta \ln P_0(Q) + \ln P(S_0) - \ln P(S_1))]\}) +$$
$$0.5(\ln\{\cosh [0.5(\Delta \ln P_0(Q) + \ln P(S_2) - \ln P(S_3))]\}) + \ln 2 +$$
$$\ln\left\{\cosh\left[0.5\begin{pmatrix} 0.25(\ln P(S_0) + \ln P(S_1) - \ln P(S_2) - \ln P(S_3)) + \\ 0.5(\ln\{\cosh [0.5(\Delta \ln P_0(Q) + \ln P(S_0) - \ln P(S_1))]\}) - \\ 0.5(\ln\{\cosh [0.5(\Delta \ln P_0(Q) + \ln P(S_2) - \ln P(S_3))]\}) \end{pmatrix}\right]\right\}$$

The following equation obtains, $$P[S_i] = \exp\left\{-\frac{1}{N_0}\int_0^T [y_0(t) - S_i]^2 \, dt\right\} \quad (13r)$$
$$= \exp\left\{-\frac{1}{N_0}[y_0^2(t) - 2\mathrm{Re}\{y_0(t)(S_i^*)^*\} + |S_i^*|^2]\right\}$$

and moreover $$S_0 = h_{00} \cdot S_{00}^* + h_{01} \cdot S_{10}^*; \; S_1 = h_{00} \cdot S_{00}^* + h_{01} \cdot S_{11}^*;$$
$$S_2 = h_{00} \cdot S_{00}^* + h_{01} \cdot S_{12}^*; \; S_3 = h_{00} \cdot S_{00}^* + h_{01} \cdot S_{13}^* \quad (13s)$$

The following are then assumed for the second member of equation (10) and the first and second members of equation (11):

$$P_0(+1+1)P(S_4)=A, \; P_0(+1-1)P(S_5)=B, \; P_0(-1+1)P(S_6)=C, \; P_0(-1-1)P(S_7)=D \quad (13w)$$

$$P_0(+1+1)P(S_8)=A, \; P_0(+1-1)P(S_9)=B, \; P_0(-1+1)P(S_{10})=C, \; P_0(-1-1)P(S_{11})=D \quad (13x)$$

$$P_0(+1+1)P(S_{12})=A, \; P_0(+1-1)P(S_{13})=B, \; P_0(-1+1)P(S_{14})=C, \; P_0(-1-1)P(S_{15})=D \quad (13y)$$

and processing similar to the above is performed. Upon substituting the results thus obtained into equations (13f) and (13i), and calculating $\ln P(d_{Re}=+1/y(t))$ and $\ln P(d_{Re}=-1/Y(t))$ in equation (12), equations (14a) to (14i) are obtained.

$$\ln P(d_{Re} = +1/y(t)) - \ln P(d_{Re} = -1/y(t)) = \Delta \ln P_{REC0}(0, I) = \quad (14a)$$
$$4\mathrm{Re}(y_0(t)h_{00}^*) + 0.5(L_1 - L_2 + L_3 + L_4) + \ln ch\{0.5(f_1 + f_2)\} - \ln ch\{0.5(f_3 + f_4)\}$$

$$L_1 = \begin{pmatrix} \ln ch\{0.5(4\mathrm{Im}(y_0(t)h_{01}^*) + \Delta \ln P_1(Q) - (4\mathrm{Re}(h_{00}h_{01}^* + 4\mathrm{Im}(h_{00}h_{01}^*)))\} - \\ \ln ch\{0.5(4\mathrm{Im}(y_0(t)h_{01}^*) + \Delta \ln P_1(Q) + (4\mathrm{Re}(h_{00}h_{01}^* + 4\mathrm{Im}(h_{00}h_{01}^*)))\} \end{pmatrix} \quad (14b)$$

$$L_2 = \begin{pmatrix} \ln ch\{0.5(4\mathrm{Im}(y_0(t)h_{01}^*) + \Delta \ln P_1(Q) - (4\mathrm{Re}(h_{00}h_{01}^* - 4\mathrm{Im}(h_{00}h_{01}^*)))\} - \\ \ln ch\{0.5(4\mathrm{Im}(y_0(t)h_{01}^*) + \Delta \ln P_1(Q) + (4\mathrm{Re}(h_{00}h_{01}^* - 4\mathrm{Im}(h_{00}h_{01}^*)))\} \end{pmatrix} \quad (14c)$$

$$L_3 = \begin{pmatrix} \ln ch\{0.5(4\mathrm{Re}(y_0(t)h_{01}^*) + \Delta \ln P_1(I) - (4\mathrm{Re}(h_{00}h_{01}^* - 4\mathrm{Im}(h_{00}h_{01}^*)))\} - \\ \ln ch\{0.5(4\mathrm{Re}(y_0(t)h_{01}^*) + \Delta \ln P_1(I) + (4\mathrm{Re}(h_{00}h_{01}^* - 4\mathrm{Im}(h_{00}h_{01}^*)))\} \end{pmatrix} \quad (14d)$$

$$L_4 = \begin{pmatrix} \ln ch\{0.5(4\mathrm{Re}(y_0(t)h_{01}^*) + \Delta \ln P_1(I) - (4\mathrm{Re}(h_{00}h_{01}^* + 4\mathrm{Im}(h_{00}h_{01}^*)))\} - \\ \ln ch\{0.5(4\mathrm{Re}(y_0(t)h_{01}^*) + \Delta \ln P_1(I) + (4\mathrm{Re}(h_{00}h_{01}^* + 4\mathrm{Im}(h_{00}h_{01}^*)))\} \end{pmatrix} \quad (14e)$$

$$f_1 = \begin{pmatrix} \ln ch\{0.5(4\mathrm{Im}(y_0(t)h_{01}^*) + \Delta \ln P_1(Q) - (4\mathrm{Im}(h_{00}h_{01}^* + 4\mathrm{Re}(h_{00}h_{01}^*)))\} - \\ \ln ch\{0.5(4\mathrm{Im}(y_0(t)h_{01}^*) + \Delta \ln P_1(Q) + (4\mathrm{Re}(h_{00}h_{01}^* - 4\mathrm{Im}(h_{00}h_{01}^*)))\} \end{pmatrix} \quad (14f)$$

$$f_2 = \begin{pmatrix} \ln ch\{0.5(4\mathrm{Re}(y_0(t)h_{01}^*) + \Delta \ln P_1(I) + (4\mathrm{Im}(h_{00}h_{01}^* - 4\mathrm{Re}(h_{00}h_{01}^*)))\} - \\ \ln ch\{0.5(4\mathrm{Re}(y_0(t)h_{01}^*) + \Delta \ln P_1(I) - (4\mathrm{Im}(h_{00}h_{01}^* + 4\mathrm{Re}(h_{00}h_{01}^*)))\} \end{pmatrix} \quad (14g)$$

$$f_3 = \begin{pmatrix} \ln ch\{0.5(4\mathrm{Im}(y_0(t)h_{01}^*) + \Delta \ln P_1(Q) - (4\mathrm{Re}(h_{00}h_{01}^* - 4\mathrm{Im}(h_{00}h_{01}^*)))\} - \\ \ln ch\{0.5(4\mathrm{Im}(y_0(t)h_{01}^*) + \Delta \ln P_1(Q) + (4\mathrm{Re}(h_{00}h_{01}^* + 4\mathrm{Im}(h_{00}h_{01}^*)))\} \end{pmatrix} \quad (14h)$$

$$f_4 = \begin{pmatrix} \ln ch\{0.5(4\mathrm{Re}(y_0(t)h_{01}^*) + \Delta \ln P_1(I) + (4\mathrm{Re}(h_{00}h_{01}^* + 4\mathrm{Im}(h_{00}h_{01}^*)))\} - \\ \ln ch\{0.5(4\mathrm{Re}(y_0(t)h_{01}^*) + \Delta \ln P_1(I) - (4\mathrm{Im}(h_{00}h_{01}^* - 4\mathrm{Re}(h_{00}h_{01}^*)))\} \end{pmatrix} \quad (14i)$$

Hence in equation (13q), each of the terms on the left of the following equation are given on the right side.

$$\ln P(S_0) - \ln P(S_1) = 4Im\{y(t)h_{01}^*\} - 4Im\{h_{00}S_{00}^*h_{01}^*\} \quad (13t)$$

$$\ln P(S_2) - \ln P(S_3) = 4Im\{y(t)h_{01}^*\} - 4Im\{h_{00}S_{00}^*h_{01}^*\} \quad (13u)$$

$$\ln P(S_0) + \ln P(S_1) - \ln P(S_2) - \ln P(S_3) = 2(4Re\{y(t)h_{01}^*\} - 4Re\{y(t)h_{00}^*S_{00}^*h_{01}^*\}) \quad (13v)$$

In the above equations, the ln of ln ch indicates the natural logarithm, and ch denotes cosh (the hyperbolic cosine).

Figure 4:
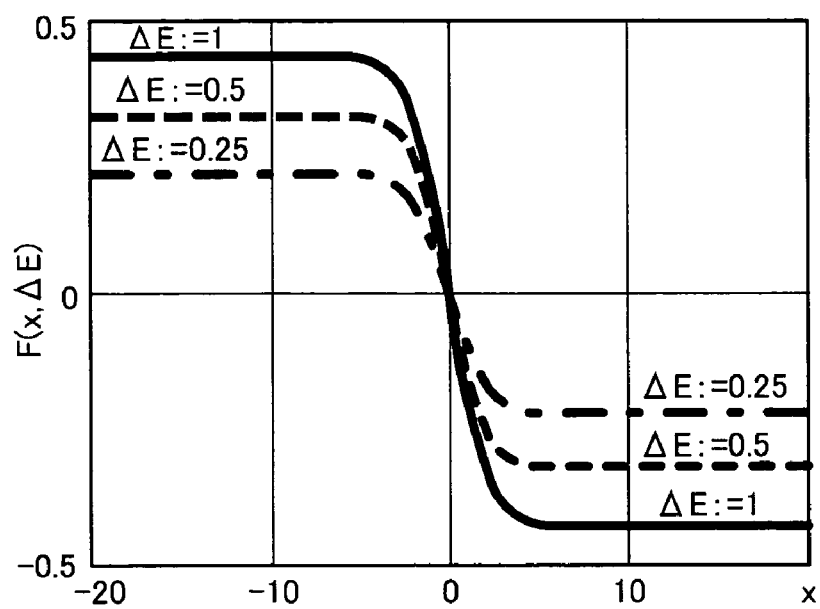
FIG. 4 shows the transfer characteristic of a limiter, which is a nonlinear element.

The nonlinear functions having the following pattern in equations (14a) to (14i), $$F(x, \Delta E) = \ln\cosh\left\{\frac{x - \Delta E}{2}\right\} - \ln\cosh\left\{\frac{x + \Delta E}{2}\right\} \quad (15)$$

can be written as limiters having a linear region. The limiter level of the nonlinear function depends on the S/N ratio (the ratio of the signal to the noise spectral power intensity $N_0$) and the energy difference $\Delta E$. FIG. 4 shows transfer functions for a nonlinear function $F(x, \Delta E)$ when the energy difference $\Delta E$ is taken as a parameter.

Here, new notation is introduced. The first notation is $$S_0 = Re\{k \cdot y_0 \cdot h_{00}^*\}, \quad S_2 = Re\{k \cdot y_0 \cdot h_{01}^*\}$$

$$S_1 = Im\{k \cdot y_0 \cdot h_{01}^*\}, \quad S_3 = Im\{k \cdot y_0 \cdot h_{00}^*\} \tag{16}$$

Figure 5:
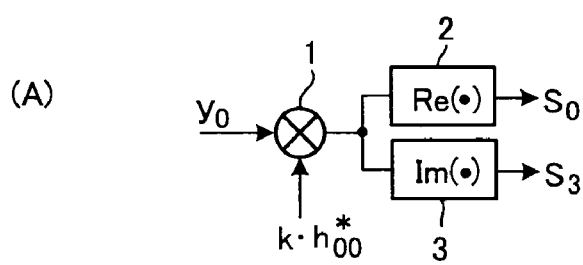
FIG. 5 shows the configuration of a first S0 to S4 generation portion.
Figure 5:
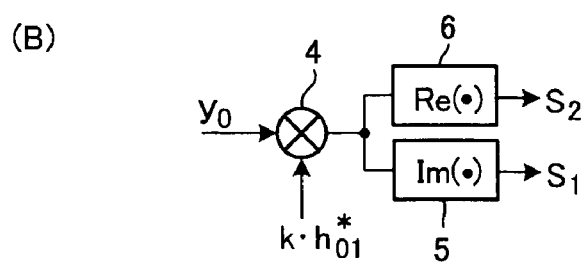

In this notation, the signals S0, S3 can be calculated by a multiplier 1 which multiplies the received signal $y_0$ by $k \cdot h_{00}^*$, a real part extraction portion 2 which extracts the real part from the multiplication result, and an imaginary part extraction portion 3 which extracts the imaginary part, as shown in (A) of FIG. 5. Further, as shown in (B) of FIG. 5, the signals S1, S2 can be calculated by a multiplier 4 which multiplies the received signal $y_0$ by $k \cdot h_{01}^*$, an imaginary part extraction portion 5 which extracts the imaginary part of the multiplication result, and a real part extraction portion 6 which extracts the real part.

The second notation is $$Im\Delta E = Im(k \cdot h_{00} \cdot h_{01}^*), \quad Re\Delta E = Re(k \cdot h_{00} \cdot h_{01}^*),$$

$$\Delta E_0 = Re\Delta E + Im\Delta E, \quad \Delta E_1 = Re\Delta E - Im\Delta E \tag{17}$$

Figure 6:
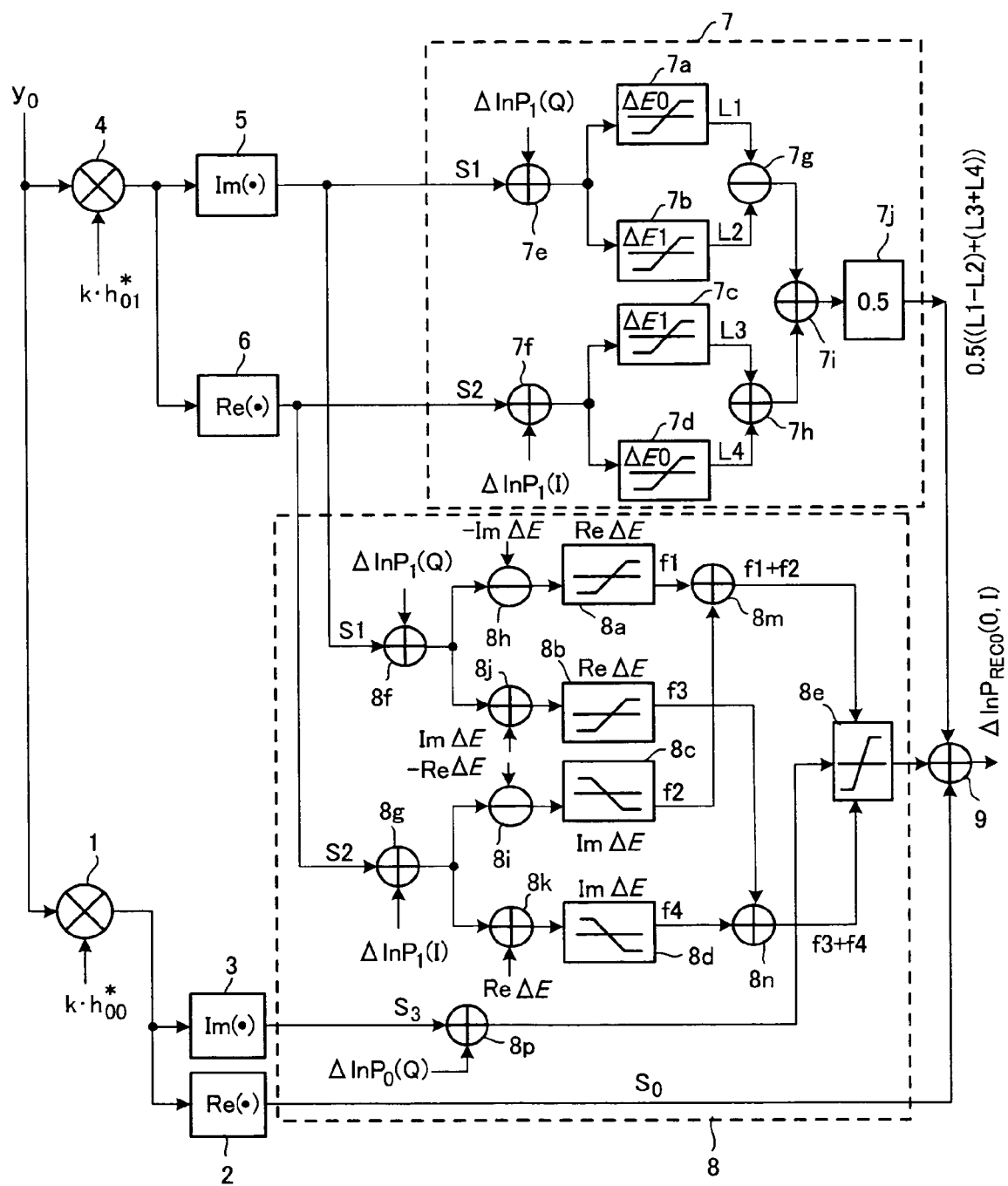
FIG. 6 shows a computation circuit which computes the difference $\Delta \ln P_{REC0}(0,I)$ in probabilities when the real part of the symbol $D_0$ is +1 and is −1 from the input signal $y_0(t)$ of the first reception device REC0.

FIG. 6 shows a computation circuit which computes the difference $\Delta \ln P_{REC0}(0,I)$ based on equation (14a); the difference $\Delta \ln P_{REC0}(0,I)$ between the probabilities that the real part of the symbol $D_0$ is +1 and is −1 is calculated based on the signal $y_0(t)$ input to the first receiver REC0. Here, the normalization factor k is taken to be $4/N_0$ (where $N_0$ is the spectral intensity of Gaussian noise).

The computation circuit of FIG. 6 is fabricated in consideration of the notation of equations (16) and (17) above and the nonlinear function of equation (15); in blocks 7 and 8, 7a to 7d and 8a to 8e indicate limiters having prescribed energy differences.

Block 7 calculates the second term on the right side of equation (14a), $(L_1 - L_2 + L_3 + L_4)$, block 8 calculates the first, third and fourth terms on the right side of equation (14a), and the adder 9 calculates and outputs $\Delta \ln P_{REC0}(0,I) = \{\ln P(d_{Re} = +1/y(t)) - \ln P(d_{Re} = -1/y(t))\}$.

In FIG. 6, it should be noted that in the blocks 7 and 8, the adders 7e, 7f, 8f, 8g add $\Delta \ln P_1(I)$ and $\Delta \ln P_1(Q)$, and the adder 8p adds $\Delta \ln P_0(Q)$. $\Delta \ln P_1(I)$ is the difference in probabilities that the real part of the symbol $D_1$ is +1 and is −1; $\Delta \ln P_1(Q)$ is the difference in probabilities that the imaginary part of the symbol $D_1$ is +1 and is −1; and when deciding the real part of the first symbol $D_0$, the posterior estimate of the second symbol $D_1$ is used to perform refinement. Further, $\Delta \ln P_0(Q)$ is the difference in probabilities that the imaginary part of the first symbol $D_0$ is +1 and is −1, and when deciding the real part of the first symbol $D_0$, the posterior estimate of the first symbol $D_0$ is used to perform refinement.

In block 7, 7g denotes a subtracter, 7h to 7i denote adders, and 7j denotes a multiplier; in block 8, 8h to 8i denote subtracters and 8j to 8p denote adders.

(b) Estimation of the Real Part $d_{Re} = Re(D_0)$ of the Symbol $D_0$ Received by the Second Receiver REC1

Similarly to equations (14a) to (14i), equations for estimating the real part $d_{Re} = Re(D_0)$ of a symbol $D_0$ received by the second receiver REC1 can easily be derived. That is, from Table 2 and Table 3, a decision table for the real part $d_{Re} = Re(D_0)$ of a symbol $D_0$ received by the second receiver REC1 is as follows.

$$\ln P(d_{Re} = +1/y(t)) - \ln P(d_{Re} = -1/y(t)) = \Delta \ln P_{REC1}(0, I) = \tag{18a}$$
$$4Re(y_1(t)h_{10}^*) + 0.5(L_1 - L_2 + L_3 + L_4) + \ln ch\{0.5(f_1 + f_2)\} - \ln ch\{0.5(f_3 + f_4)\}$$

$$L_1 = \begin{pmatrix} \ln ch\{0.5(4Im(y_1(t)h_{11}^*) + \Delta \ln P_0(Q) - (4Re(h_{10}h_{11}^* + 4Im(h_{10}h_{11}^*)))\} - \\ \ln ch\{0.5(4Im(y_1(t)h_{11}^*) + \Delta \ln P_0(Q) + (4Re(h_{10}h_{11}^* + 4Im(h_{10}h_{11}^*)))\} \end{pmatrix} \tag{18b}$$

$$L_2 = \begin{pmatrix} \ln ch\{0.5(4Im(y(t)h_{01}^*) + \Delta \ln P_0(Q) - (4Re(h_{00}h_{01}^* - 4Im(h_{00}h_{01}^*)))\} - \\ \ln ch\{0.5(4Im(y(t)h_{01}^*) + \Delta \ln P_0(Q) + (4Re(h_{00}h_{01}^* - 4Im(h_{00}h_{01}^*)))\} \end{pmatrix} \tag{18c}$$

$$L_3 = \begin{pmatrix} \ln ch\{0.5(4Re(y_1(t)h_{11}^*) + \Delta \ln P_0(I) - (4Re(h_{10}h_{11}^* - 4Im(h_{10}h_{11}^*)))\} - \\ \ln ch\{0.5(4Re(y_1(t)h_{11}^*) + \Delta \ln P_0(I) + (4Re(h_{10}h_{11}^* - 4Im(h_{10}h_{11}^*)))\} \end{pmatrix} \tag{18d}$$

$$L_4 = \begin{pmatrix} \ln ch\{0.5(4Re(y_1(t)h_{11}^*) + \Delta \ln P_0(I) - (4Re(h_{10}h_{11}^* + 4Im(h_{10}h_{11}^*)))\} - \\ \ln ch\{0.5(4Re(y_1(t)h_{11}^*) + \Delta \ln P_0(I) + (4Re(h_{10}h_{11}^* + 4Im(h_{10}h_{11}^*)))\} \end{pmatrix} \tag{18e}$$

$$f_1 = \begin{pmatrix} \ln ch\{0.5(4Im(y_1(t)h_{11}^*) + \Delta \ln P_0(Q) - (4Im(h_{10}h_{11}^* + 4Re(h_{10}h_{11}^*)))\} - \\ \ln ch\{0.5(4Im(y_1(t)h_{11}^*) + \Delta \ln P_0(Q) + (4Im(h_{10}h_{11}^* - 4Im(h_{10}h_{11}^*)))\} \end{pmatrix} \tag{18f}$$

$$f_2 = \begin{pmatrix} \ln ch\{0.5(4Re(y_1(t)h_{11}^*) + \Delta \ln P_0(I) - (4Re(h_{10}h_{11}^* - 4Im(h_{10}h_{11}^*)))\} - \\ \ln ch\{0.5(4Re(y_1(t)h_{11}^*) + \Delta \ln P_0(I) - (4Im(h_{10}h_{11}^* + 4Re(h_{10}h_{11}^*)))\} \end{pmatrix} \tag{18g}$$

$$f_3 = \begin{pmatrix} \ln ch\{0.5(4Im(y_1(t)h_{11}^*) + \Delta \ln P_0(Q) - (4Re(h_{10}h_{11}^* - 4Im(h_{10}h_{11}^*)))\} - \\ \ln ch\{0.5(4Im(y_1(t)h_{11}^*) + \Delta \ln P_0(Q) + (4Re(h_{10}h_{11}^* + 4Im(h_{10}h_{11}^*)))\} \end{pmatrix} \tag{18h}$$

$$f_4 = \begin{pmatrix} \ln ch\{0.5(4Re(y_1(t)h_{11}^*) + \Delta \ln P_0(I) + (4Re(h_{10}h_{11}^* + 4Im(h_{10}h_{11}^*)))\} - \\ \ln ch\{0.5(4Re(y_1(t)h_{11}^*) + \Delta \ln P_0(I) + (4Re(h_{10}h_{11}^* - 4Im(h_{10}h_{11}^*)))\} \end{pmatrix} \tag{18i}$$

Here, the following new notation is introduced.

$$S0=Re\{k \cdot y_1 \cdot h_{10}{}^*\},$$
$$S1=Im\{k \cdot y_1 \cdot h_{11}{}^*\} \quad S2=Re\{k \cdot y_1 \cdot h_{11}{}^*\},$$
$$S3=Im\{k \cdot y_1 \cdot h_{10}{}^*\}$$

$$Im\Delta E=Im(k \cdot h_{10} \cdot h_{11}{}^*), Re\Delta E=Re(k \cdot h_{10} \cdot h_{11}{}^*),$$

$$\Delta E_0=Re\Delta E+Im\Delta E, \Delta E_1=Re\Delta E-Im\Delta E \tag{19}$$

Figure 7:
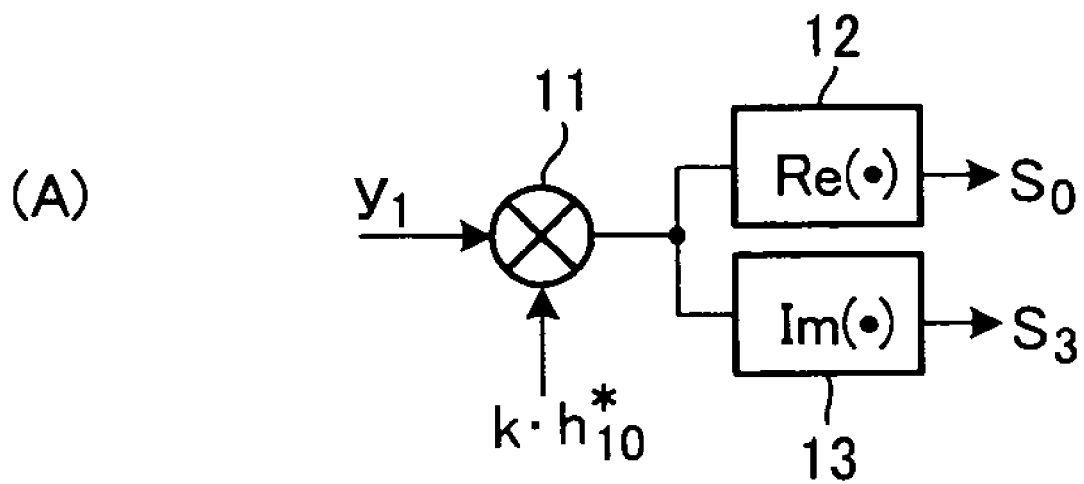
FIG. 7 shows the configuration of a second S0 to S4 generation portion.
Figure 7:
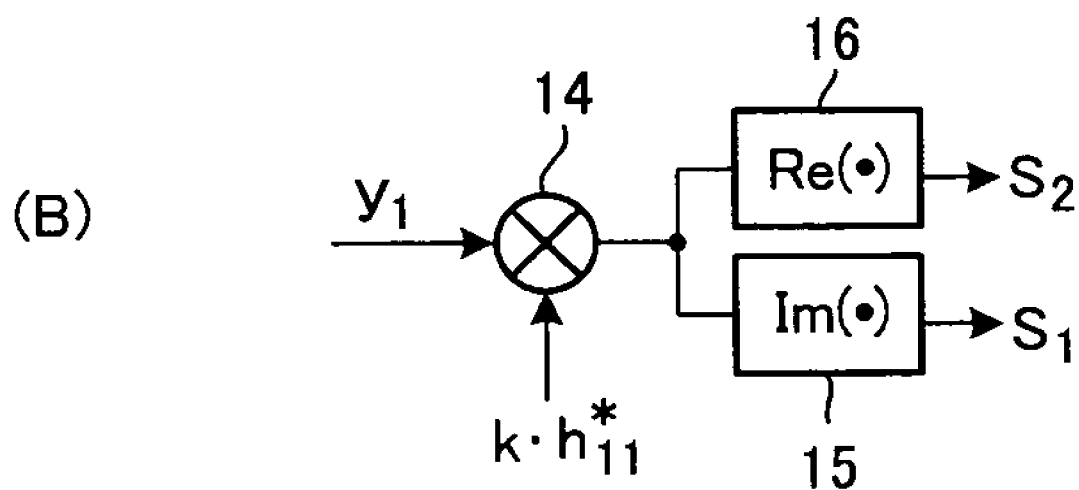

The signals S0, S3 in the above notation, can be calculated by a multiplier 11 which multiplies the received signal $y_1$ by $k \cdot h_{10}{}^*$, a real part extraction portion 12 which extracts the real part of the multiplication result, and an imaginary part extraction portion 13 which extracts the imaginary part, as indicated by (A) in FIG. 7. Further, signals S1, S2 can be calculated by a multiplier 14 which multiplies the received signal $y_1$ by $k \cdot h_{11}{}^*$, an imaginary part extraction portion 15 which extracts the imaginary part of the multiplication result, and a real part extraction portion 16 which extracts the real part, as indicated by (B) in FIG. 7.

Figure 8:
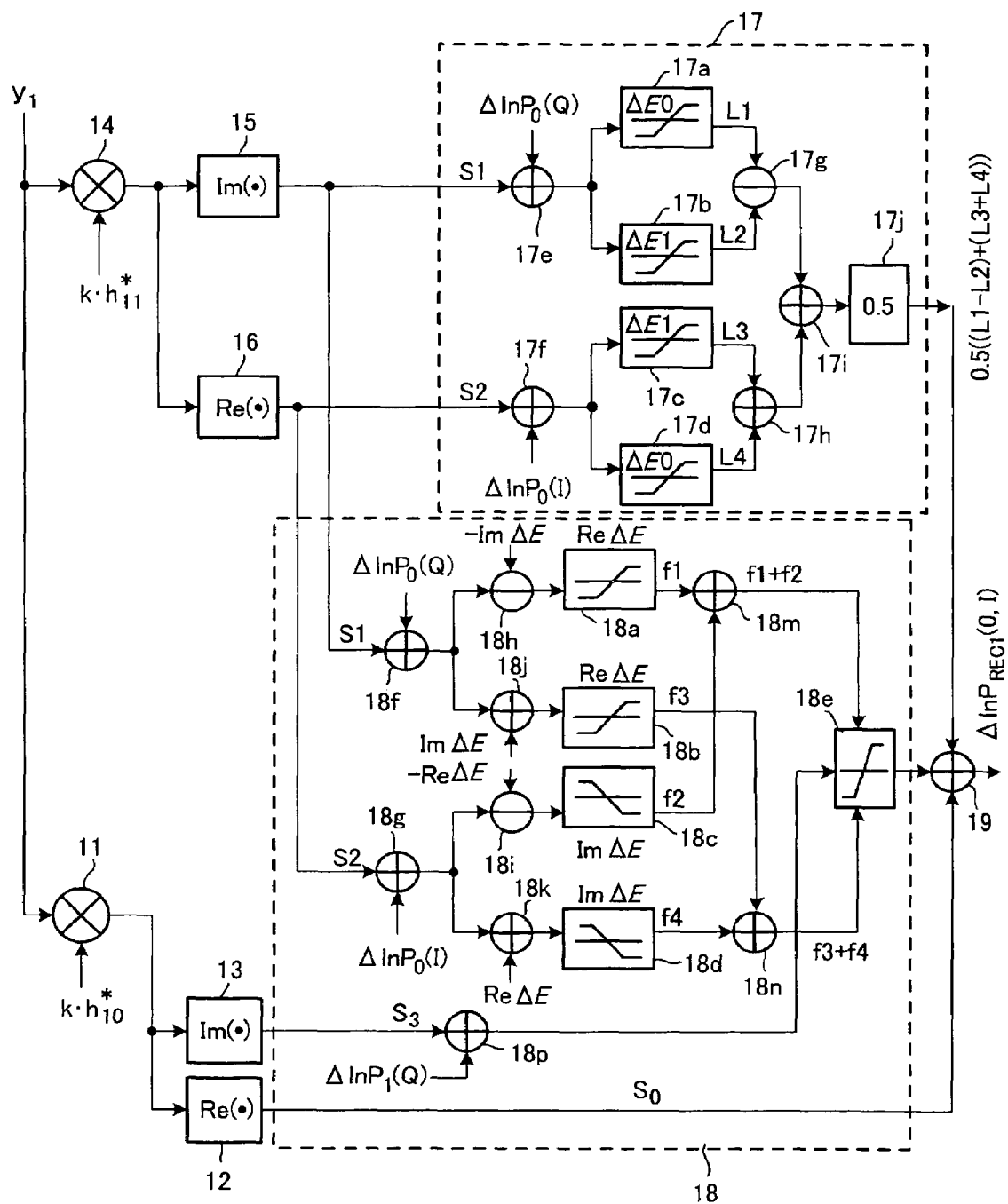
FIG. 8 shows a computation circuit which computes the difference $\Delta \ln P_{REC1}(0,I)$ in probabilities when the real part of the symbol $D_0$ is +1 and is −1 from the input signal $y_1(t)$ of the second reception device REC1.

FIG. 8 shows a computation circuit which computes $\Delta \ln P_{REC1}(0,I)$ based on equation (18a), using the input signal $y_1(t)$ of the second receiver REC1 to compute the difference in probabilities $\Delta \ln P_{REC1}(0,I)$ that the real part of the symbol $D_0$ is +1 and is −1. Here, the normalization factor k is set equal to $4/N_0$ (where $N_0$ is the spectral intensity of Gaussian noise).

The computation circuit of FIG. 8 is fabricated in consideration of the notation of equation (19) above and the nonlinear function of equation (15); in blocks 17 and 18, 17a to 17d and 18a to 18e indicate the limiters of FIG. 4 having prescribed energy differences.

Block 17 calculates the second term on the right side of equation (18a), $(L_1-L_2+L_3+L_4)$, block 18 calculates the first, third and fourth terms on the right side of equation (18a), and the adder 19 calculates and outputs $\Delta \ln P_{REC1}(0,I)=\{\ln P(d_{Re}=+1/y(t))-\ln P(d_{Re}=-1/y(t))\}$.

In FIG. 8 it should be noted that in blocks 17 and 18, the adders 17e, 17f, 18f, 18g add $\Delta \ln P_0(I)$ and $\Delta \ln P_0(Q)$, and that the adder 18p adds $\Delta \ln P_1(Q)$. $\Delta \ln P_0(I)$ is the difference in probabilities that the real part of the symbol $D_0$ is +1 and is −1; $\Delta \ln P_0(Q)$ is the difference in probabilities that the imaginary part of the symbol $D_0$ is +1 and is −1; and when deciding the real part of the first symbol $D_0$, the posterior estimate of the first symbol $D_0$ is used to perform refinement. $\Delta \ln P_1(Q)$ is the difference in probabilities that the imaginary part of the second symbol $D_1$ is +1 and is −1; when deciding the real part of the first symbol $D_0$, the posterior estimate of the second symbol $D_1$ is used to perform refinement.

In block 17, 17g denotes a subtracter, 17h and 17i denote adders, and 17j denotes a multiplier; in block 18, 18h and 18i denote subtracters, and 18j to 18p denote adders.

(c) Combination of $\Delta \ln P_{REC0}(0,I)$ and $\Delta \ln P_{REC1}(0,I)$

The sum of the estimate $\Delta \ln P_{REC0}(0,I)$ and the estimate $\Delta \ln P_{REC1}(0,I)$ calculated in the above (a) and (b) is the [difference in] probability values $\Delta \ln P_0(I)$ when the real part of the first symbol $D_0$ is +1 and is −1. Here, $\Delta \ln P_{REC0}(0,I)$ is the estimate computed from the signal $y_0(t)$ received by the first receiver REC0 (the difference in probabilities when the real part of the first symbol $D_0$ is +1 and is −1), and $\Delta \ln P_{REC1}(0,I)$ is the estimate computed from the signal $y_1(t)$ received by the second receiver REC1 (the difference in probabilities when the real part of the first symbol $D_0$ is +1 and is −1).

Figure 9:
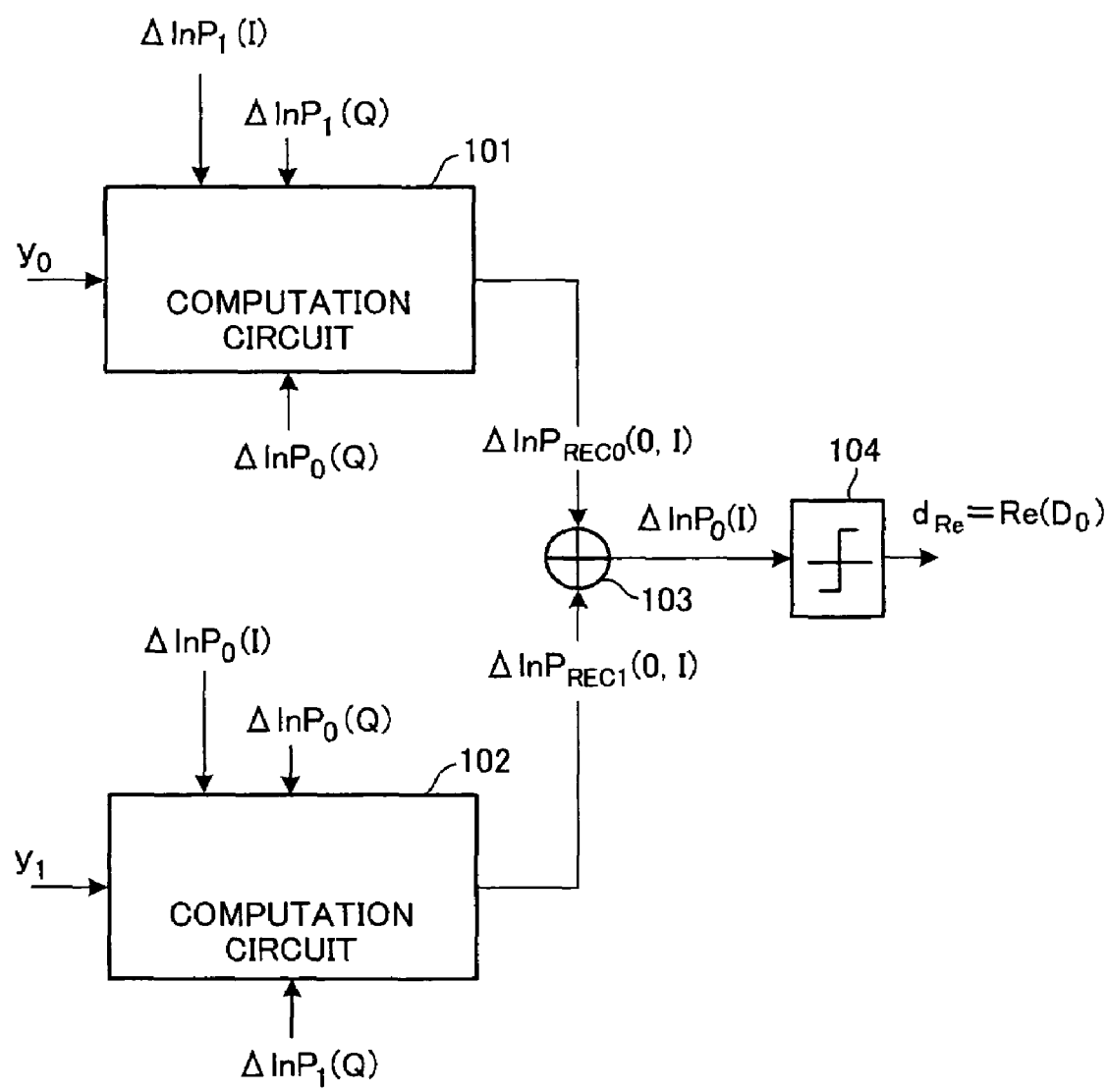
FIG. 9 shows a decision circuit for the real part of the first symbol $D_0$.

FIG. 9 shows the decision circuit for the real part of the first symbol $D_0$; the computation circuit 101, comprising the configuration of FIG. 6, outputs the estimate $\Delta \ln P_{REC0}(0,I)$, the computation circuit 102, comprising the configuration of FIG. 8, outputs the estimate $\Delta \ln P_{REC1}(0,I)$, the adder 103 adds the estimate $\Delta \ln P_{REC0}(0,I)$ and the estimate $\Delta \ln P_{REC1}$ (0,I) and outputs the synthesized estimate $\Delta \ln P_0(I)$, and the decision portion 104, based on the synthesized estimate $\Delta \ln P_0(I)$, decides whether the real part of the first symbol $D_0$ is +1 or −1, and outputs the decision result $d_{Re}=Re(D_0)$.

When deciding the real part of the first symbol $D_0$, this decision circuit uses the posterior estimates $\Delta \ln P_1(I)$, $\Delta \ln P_1(Q)$ of the real and imaginary parts of the second symbol $D_1$ to perform refinement, and also uses the posterior estimates $\Delta \ln P_0(I)$, $\Delta \ln P_0(Q)$ of the real and imaginary parts of the symbol itself $D_0$ to perform refinement.

(d) Turbo Algorithm

As is clear from equation (14a) and equation (18a), when determining the sign of the real part of the transmitted first symbol $D_0$, decision information obtained previously for the first and second symbols is used. This decision information is $\Delta \ln P_0(I)$, $\Delta \ln P_0(Q)$, $\Delta \ln P_1(I)$, $\Delta \ln P_1(Q)$ in the first symbol decision equations (14a) and (18a), and represent the difference in logarithms of the posterior probabilities (soft decisions) that the signs of the real and imaginary parts of the first and second symbols are "+" and "−". Because all calculations are performed serially, during processing according to equations (14a) and (18a), it is possible to perform iterative calculations adopting the latest posterior probabilities for the first and second symbols. The proposed algorithm is similar to well-known turbo decoder methods designed for use with turbo codes.

Because of the similarity with turbo decoders, the algorithm of this invention is called a turbo receiver. The famous injunction of Viterbi, to never discard information prematurely that may be useful in making a decision until, after all decisions related to that information have been completed, is extremely well-suited to the turbo receiver of this invention.

Because all calculations are performed in order for each symbol, iterative calculations are performed adopting the most recent posterior probability estimates from adjacent channels. In a turbo decoder, each decoder passes information to other decoders, and uses information obtained from other decoders to refine posterior probabilities estimated in order. Similarly in the algorithm of this invention, information derived after nonlinear processing for one symbol is used in refining the posterior probabilities estimated for the other symbol, and information derived from the other symbol is used in refining the posterior probabilities estimated for the first symbol. As in an iterative turbo decoder, the algorithm of this invention performs iteration once or more before making a final decision for a received information symbol. In a turbo decoder, if individual decoder outputs are in the form of hard bit decisions (hard decisions), then there is only a slight advantage to sharing the information. However, in this invention, hard bit decisions are performed only in the final iteration.

(e) Decision of the Real Part $d_{Re}=Re(D_1)$ of the Second Symbol $D_1$

In the above, decision of the real part $d_{Re}=Re(D_0)$ of the first symbol $D_0$ was explained; by a similar procedure, a decision can be made for the real part $d_{Re}=Re(D_1)$ of the second symbol $D_1$.

(e-1) Estimation of the Real Part $d_{Re}=Re(D_1)$ of the Symbol $D_1$ Received by the First Receiver REC0

The first receiver REC0 outputs an estimate $\Delta \ln P_{REC0}(1,I)$ of the real part $d_{Re}=Re(D_1)$ of the second symbol $D_1$ according to an algorithm similar to the algorithm shown in FIG. 6. However, $$S_0=Re\{k \cdot y_0 \cdot h_{01}{}^*\}, S_1=Im\{k \cdot y_0 \cdot h_{00}{}^*\}$$

$$S_2=Re\{k \cdot y_0 \cdot h_{00}{}^*\}, S_3=Im\{k \cdot y_0 \cdot h_{01}{}^*\}$$

$$Im\Delta E = Im(k \cdot h_{01} \cdot h_{00}^*), Re\Delta E = Re(k \cdot h_{01} \cdot h_{00}^*),$$

$$\Delta E_0 = Re\Delta E + Im\Delta E, \Delta E_1 = Re\Delta E - Im\Delta E \quad (20)$$

(e-2) Estimation of the Real Part $d_{Re} = Re(D_1)$ of the Symbol $D_1$ Received by the Second Receiver REC1

The second receiver REC1 outputs an estimate $\Delta\ln P_{REC1}$ (1,I) of the real part $d_{Re} = Re(D_1)$ of the second symbol $D_1$ according to an algorithm similar to the algorithm shown in FIG. 8. However, $$S_0 = Re\{k \cdot y_1 \cdot h_{11}^*\}, S_1 = Im\{k \cdot y_1 \cdot h_{10}^*\}$$

$$S_2 = Re\{k \cdot y_1 \cdot h_{10}^*\}, S_3 = Im\{k \cdot y_1 \cdot h_{11}^*\}$$

$$Im\Delta E = Im(k \cdot h_{11} \cdot h_{10}^*), Re\Delta E = Re(k \cdot h_{11} \cdot h_{10}^*),$$

$$\Delta E_0 = Re\Delta E + Im\Delta E, \Delta E_1 = Re\Delta E - Im\Delta E \quad (21)$$

The sum of the estimate $\Delta\ln P_{REC0}(1,I)$ and the estimate $\Delta\ln P_{REC1}(1,I)$ obtained in the above (e-1) and (e-2) is the estimate $\Delta\ln P_1(I)$ when the real part of the second symbol $D_1$ is +1 and when it is −1. Here, $\Delta\ln P_{REC0}(1,I)$ is the estimate determined from the signal $y_0(t)$ received by the first receiver REC0 (the difference in probabilities when the real part of the second symbol $D_1$ is +1 and when it is −1), and $\Delta\ln P_{REC1}(1,I)$ is the estimate determined from the signal $y_1(t)$ received by the second receiver REC1 (the difference in probabilities when the real part of the second symbol $D_1$ is +1 and when it is −1).

Figure 10:
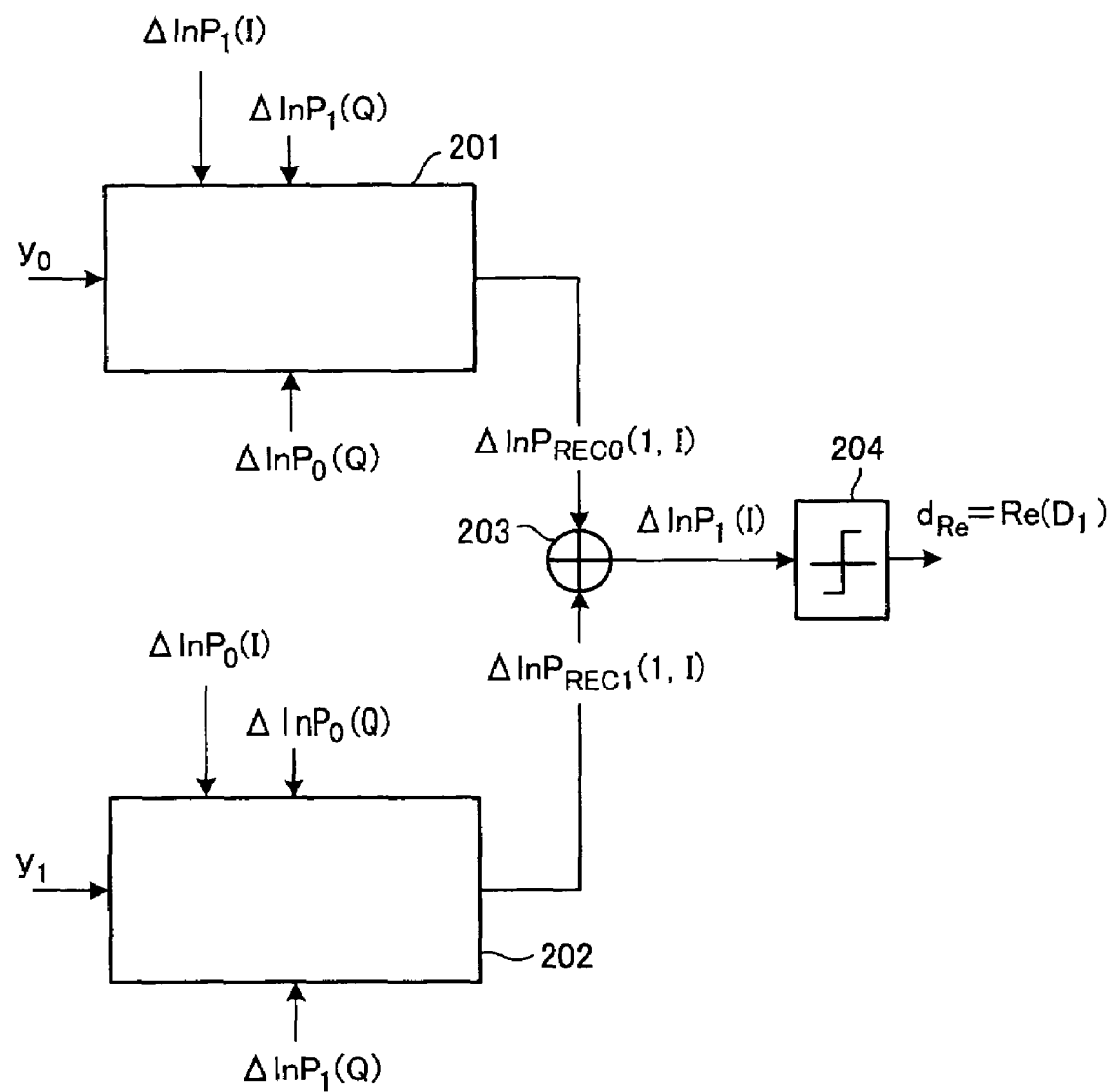
FIG. 10 shows a decision circuit for the real part of the second symbol $D_1$.

FIG. 10 shows the decision circuit for the real part of the second symbol $D_1$; the computation circuit 201 outputs the estimate $\Delta\ln P_{REC0}(1,I)$, the computation circuit 202 outputs the estimate $\Delta\ln P_{REC1}(1,I)$, the adder 203 adds the estimate $\Delta\ln P_{REC0}(1,I)$ and the estimate $\Delta\ln P_{REC1}(1,I)$ and outputs the synthesized estimate $\Delta\ln P_1(I)$, and based on the synthesized estimate $\Delta\ln P_1(I)$, the decision portion 204 judges whether the real part of the second symbol $D_1$ is +1 or −1, and outputs the decision result $d_{Re} = Re(D_1)$.

When deciding the real part of the second symbol $D_1$, this decision circuit uses the posterior estimates $\Delta\ln P_0(I)$, $\Delta\ln P_0(Q)$ of the real and imaginary parts of the first symbol $D_0$ to perform refinement, and also uses the posterior estimates $\Delta\ln P_1(I)$, $\Delta\ln P_1(Q)$ of the real and imaginary parts of the symbol $D_1$ itself to perform refinement.

(f) Estimation of the Imaginary Part $d_{Im} = Im(D_0)$ of the First Symbol $D_0$ Received by the First Receiver REC0

Similarly to the case of the real part of the first symbol, from Table 2, the probabilities that the first receiver REC0 receives $d_{Im} = +1$ and $d_{Im} = -1$ are respectively $$P(d_{Im}=+1) = P_a(S_0(P(S_0) + P_a(S_1)P(S_1) + P_a(S_2)P(S_2) + P_a(S_3)P(S_3) + P_a(S_8)P(S_8) + P_a(S_9)P(S_9) + P_a(S_{10})P(S_{10}) + P_a(S_{11})P(S_{11}) \quad (22)$$

$$P(d_{Im}=-1) = P_a(S_4)P(S_4) + P_a(S_5)P(S_5) + P_a(S_6)P(S_6) + P_a(S_7)P(S_7) + P_a(S_{12})P(S_{12}) + P_a(S_{13})P(S_{13}) + P_a(S_{14})P(S_{14}) + P_a(S_{15})P(S_{15}) \quad (22)'$$

Similarly to the real part, the decision rules to decide the sign of the imaginary part $d_{Im}$ of the first symbol are given by the following equations.

$$\ln P(d_{Im}=+1/y_0(t)) - \ln P(d_{Im}=-1/y_0(t)) = \Delta\ln P_{REC0}(0,Q) = \quad (23a)$$
$$4\text{Im}(y_0(t)h_{00}^*) + 0.5(L_1 + L_2 + L_3 - L_4) + \ln ch\{0.5(f_1+f_2)\} - \ln ch\{0.5(f_3+f_4)\}$$

$$L_1 = \begin{pmatrix} \ln ch\{0.5(4\text{Im}(y_0(t)h_{01}^*) + \Delta\ln P_1(Q) - (4\text{Im}(h_{00}h_{01}^*) + 4\text{Re}(h_{00}h_{01}^*)))\} - \\ \ln ch\{0.5(4\text{Im}(y_0(t)h_{01}^*) + \Delta\ln P_1(Q) + (4\text{Im}(h_{00}h_{01}^*) + 4\text{Re}(h_{00}h_{01}^*)))\} \end{pmatrix} \quad (23b)$$

$$L_2 = \begin{pmatrix} \ln ch\{0.5(4\text{Im}(y_0(t)h_{01}^*) + \Delta\ln P_1(Q) - (4\text{Re}(h_{00}h_{01}^*) - 4\text{Im}(h_{00}h_{01}^*)))\} - \\ \ln ch\{0.5(4\text{Im}(y_0(t)h_{01}^*) + \Delta\ln P_1(Q) + (4\text{Re}(h_{00}h_{01}^*) - 4\text{Im}(h_{00}h_{01}^*)))\} \end{pmatrix} \quad (23c)$$

$$L_3 = \begin{pmatrix} \ln ch\{0.5(4\text{Re}(y_0(t)h_{01}^*) + \Delta\ln P_1(I) - (4\text{Re}(h_{00}h_{01}^*) + 4\text{Im}(h_{00}h_{01}^*)))\} - \\ \ln ch\{0.5(4\text{Re}(y_0(t)h_{01}^*) + \Delta\ln P_1(I) + (4\text{Re}(h_{00}h_{01}^*) + 4\text{Im}(h_{00}h_{01}^*)))\} \end{pmatrix} \quad (23d)$$

$$L_4 = \begin{pmatrix} \ln ch\{0.5(4\text{Re}(y_0(t)h_{01}^*) + \Delta\ln P_1(I) - (4\text{Re}(h_{00}h_{01}^*) + 4\text{Im}(h_{00}h_{01}^*)))\} - \\ \ln ch\{0.5(4\text{Re}(y_0(t)h_{01}^*) + \Delta\ln P_1(I) + (4\text{Re}(h_{00}h_{01}^*) + 4\text{Im}(h_{00}h_{01}^*)))\} \end{pmatrix} \quad (23e)$$

$$f_1 = \begin{pmatrix} \ln ch\{0.5(4\text{Im}(y_0(t)h_{01}^*) + \Delta\ln P_1(Q) - (4\text{Re}(h_{00}h_{01}^*) + 4\text{Im}(h_{00}h_{01}^*)))\} - \\ \ln ch\{0.5(4\text{Im}(y_0(t)h_{01}^*) + \Delta\ln P_1(Q) - (4\text{Re}(h_{00}h_{01}^*) - 4\text{Im}(h_{00}h_{01}^*)))\} \end{pmatrix} \quad (23f)$$

$$f_2 = \begin{pmatrix} \ln ch\{0.5(4\text{Re}(y_0(t)h_{01}^*) + \Delta\ln P_1(I) + (4\text{Im}(h_{00}h_{01}^*) + 4\text{Re}(h_{00}h_{01}^*)))\} - \\ \ln ch\{0.5(4\text{Re}(y_0(t)h_{01}^*) + \Delta\ln P_1(I) + (4\text{Im}(h_{00}h_{01}^*) - 4\text{Re}(h_{00}h_{01}^*)))\} \end{pmatrix} \quad (23g)$$

$$f_3 = \begin{pmatrix} \ln ch\{0.5(4\text{Im}(y_0(t)h_{01}^*) + \Delta\ln P_1(Q) + (4\text{Re}(h_{00}h_{01}^*) - 4\text{Im}(h_{00}h_{01}^*)))\} - \\ \ln ch\{0.5(4\text{Im}(y_0(t)h_{01}^*) + \Delta\ln P_1(Q) + (4\text{Re}(h_{00}h_{01}^*) + 4\text{Im}(h_{00}h_{01}^*)))\} \end{pmatrix} \quad (23h)$$

$$f_4 = \begin{pmatrix} \ln ch\{0.5(4\text{Re}(y_0(t)h_{01}^*) + \Delta\ln P_1(I) + (4\text{Re}(h_{00}h_{01}^*) - 4\text{Im}(h_{00}h_{01}^*)))\} - \\ \ln ch\{0.5(4\text{Re}(y_0(t)h_{01}^*) + \Delta\ln P_1(I) - (4\text{Re}(h_{00}h_{01}^*) + 4\text{Im}(h_{00}h_{01}^*)))\} \end{pmatrix} \quad (23i)$$

Here, new notation is introduced. The first notation is $$S_0 = Im\{k \cdot y_0 \cdot h_{00}^*\}, S_1 = Im\{k \cdot y_0 \cdot h_{01}^*\},$$

$$S_2 = re\{k \cdot y_0 \cdot h_{01}^*\}, S_3 = Re\{k \cdot y_0 \cdot h_{00}^*\} \quad (24)$$

Figure 11:
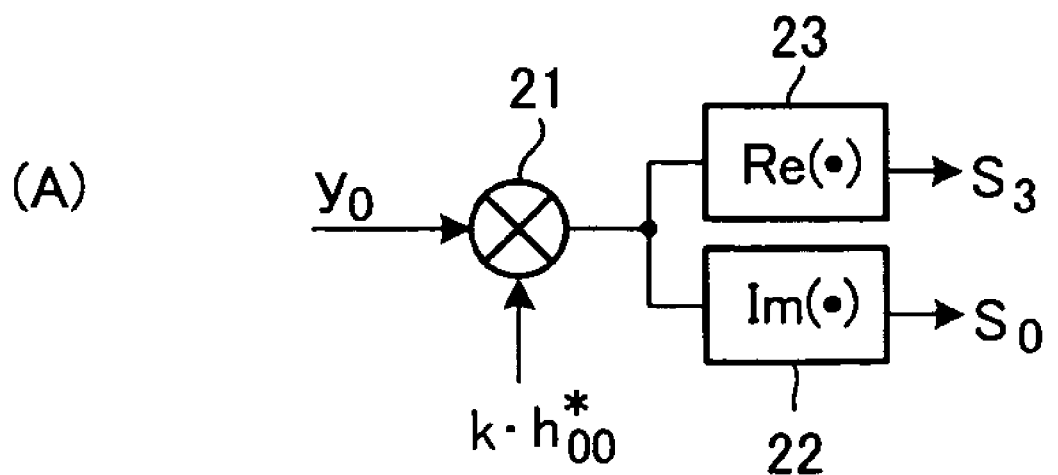
FIG. 11 shows the configuration of a third S0 to S4 generation portion.
Figure 11:
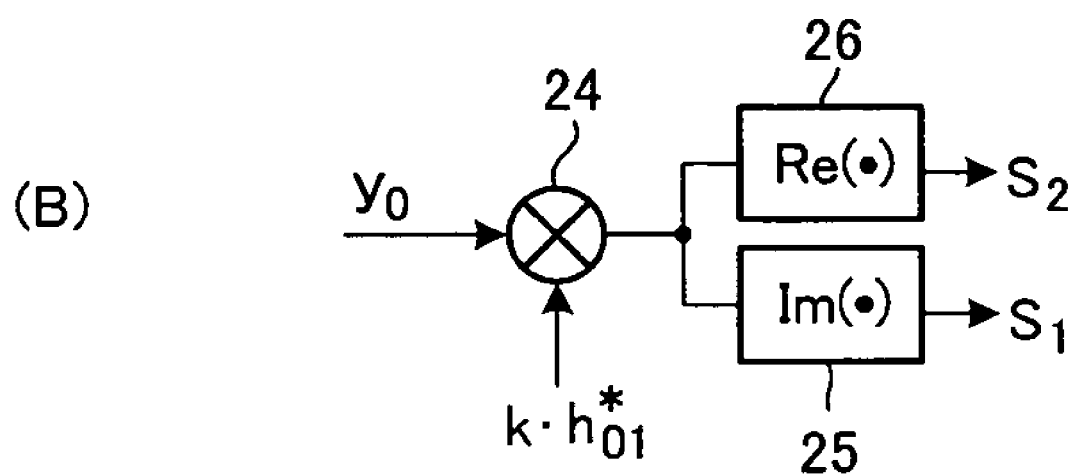

The signals S0, S3 in this notation can be calculated by the multiplier 21 which multiplies the received signal $y_0$ by $k \cdot h_{00}^*$, the imaginary part extraction portion 22 which extracts the imaginary part from the multiplication result, and the real part extraction portion 23 which extracts the real part, as shown in (A) of FIG. 11. And, the signals S1, S2 in this notation can be calculated by the multiplier 24 which multiplies the received signal $y_0$ by $k \cdot h_{01}^*$, the imaginary part extraction portion 25 which extracts the imaginary part from the multiplication result, and the real part extraction portion 26 which extracts the real part, as shown in (B) of FIG. 11.

The second notation is $$Im\Delta E = Im(k \cdot h_{00} \cdot h_{01}^*), Re\Delta E = Re(k \cdot h_{00} \cdot h_{01}^*),$$

$$\Delta E_0 = Re\Delta E + Im\Delta E, \Delta E_1 = Re\Delta E - Im\Delta E \tag{25}$$

Figure 12:
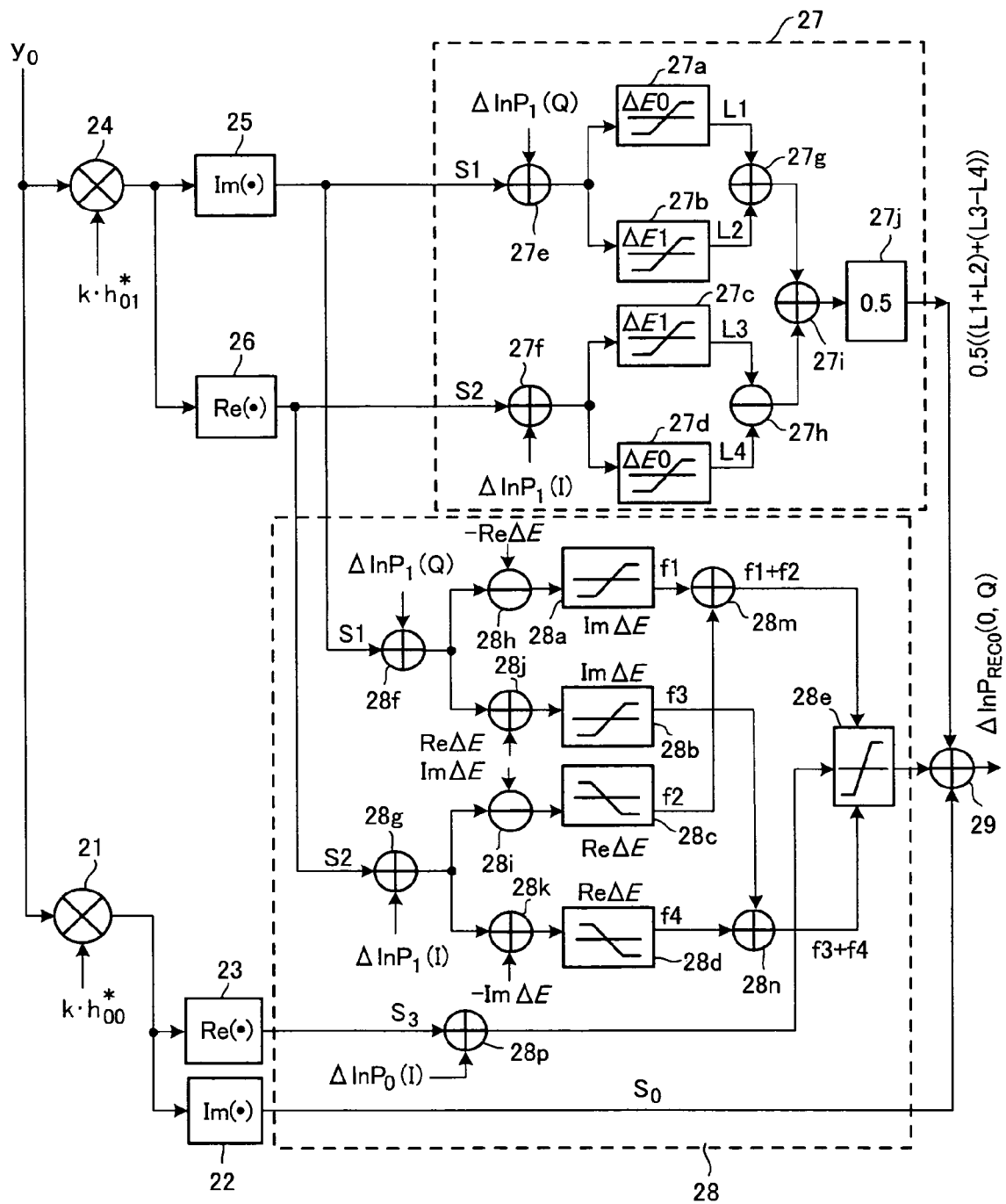
FIG. 12 shows a computation circuit which computes the difference $\Delta \ln P_{REC0}(0,Q)$ in probabilities when the imaginary part of the symbol $D_0$ is +1 and is −1 from the input signal $y_0(t)$ of the first reception device REC0.

FIG. 12 shows a computation circuit which, based on equation (23a), computes $\Delta \ln P_{REC0}(0,Q)$, computing the difference $\Delta \ln P_{REC0}(0,Q)$ in probabilities when the imaginary part of the symbol $D_0$ is +1 and is −1 from the signal $y_0(t)$ input to the first receiver REC0. However, the normalization factor k is taken to be $4/N_0$ (where $N_0$ is the spectral intensity of Gaussian noise).

The computation circuit of FIG. 12 is fabricated in consideration of the notation of equations (24) and (25) above and the nonlinear function of equation (15); in blocks 27 and 28, 27a to 27d and 28a to 28e indicate limiters of FIG. 4 having prescribed energy differences.

Block 27 calculates the second term on the right side of equation (23a), $(L_1+L_2+L_3-L_4)$, block 28 calculates the first, third and fourth terms on the right side of equation (23a), and the adder 29 calculates and outputs $\Delta \ln P_{REC0}(0,Q) = \{\ln P (d_{Im}=+1/y(t)) - \ln P(d_{Im}=-1/y(t))\}$.

In FIG. 12, it should be noted that in the blocks 27 and 28, the adders 27e, 27f, 28f, 28g add $\Delta \ln P_1(I)$ and $\Delta \ln P_1(Q)$, and the adder 28p adds $\Delta \ln P_0(I)$. $\Delta \ln P_1(I)$ is the difference in probabilities that the real part of the second symbol $D_1$ is +1 and is −1; $\Delta \ln P_1(Q)$ is the difference in probabilities that the imaginary part of the second symbol $D_1$ is +1 and is −1; and when deciding the imaginary part of the first symbol $D_0$, the posterior estimate of the second symbol $D_1$ is used to perform refinement. Further, $\Delta \ln P_0(I)$ is the difference in probabilities that the real part of the first symbol $D_0$ is +1 and is −1, and when deciding the imaginary part of the first symbol $D_0$, the posterior estimate of the first symbol $D_0$ is used to perform refinement.

In block 27, 27g denotes a subtracter, 27h to 27i denote adders, and 27j denotes a multiplier; in block 28, 28h to 28i denote subtracters and 28j to 28p denote adders.

(g) Estimation of the Imaginary Part $d_{Im}=Im(D_0)$ of the Symbol $D_0$ Received by the Second Receiver REC1

Similarly to equations (23a) to (23i), equations to estimate the imaginary part $d_{Im}=Im(D_0)$ of the symbol $D_0$ received by the second receiver REC1 can easily be derived. That is, as is seen from Table 2 and Table 3, the decision rules for the imaginary part $d_{Im}=Im(D_0)$ of the symbol $D_0$ received by the second receiver REC1 are as follows.

$$\ln P(d_{Im} = +1/y_1(t)) - \ln P(d_{Im} = -1/y_1(t)) = \Delta \ln P_{REC1}(0, Q) = \tag{26a}$$
$$4Im(y_1(t)h_{10}^*) + 0.5(L_1 + L_2 + L_3 - L_4) + \ln ch\{0.5(f_1 + f_2)\} - \ln ch\{0.5(f_3 + f_4)\}$$

$$L_1 = \begin{pmatrix} \ln ch\{0.5(4Im(y_1(t)h_{11}^*) + \Delta \ln P_0(Q) - (4Im(h_{10}h_{11}^*) + 4Re(h_{10}h_{11}^*)))\} - \\ \ln ch\{0.5(4Im(y_1(t)h_{11}^*) + \Delta \ln P_0(Q) + (4Im(h_{10}h_{11}^*) + 4Re(h_{10}h_{11}^*)))\} \end{pmatrix} \tag{26b}$$

$$L_2 = \begin{pmatrix} \ln ch\{0.5(4Im(y_1(t)h_{11}^*) + \Delta \ln P_0(Q) - (4Re(h_{10}h_{11}^*) - 4Im(h_{10}h_{11}^*)))\} - \\ \ln ch\{0.5(4Im(y_1(t)h_{11}^*) + \Delta \ln P_0(Q) + (4Re(h_{10}h_{11}^*) - 4Im(h_{10}h_{11}^*)))\} \end{pmatrix} \tag{26c}$$

$$L_3 = \begin{pmatrix} \ln ch\{0.5(4Re(y_1(t)h_{01}^*) + \Delta \ln P_0(I) - (4Re(h_{10}h_{11}^*) - 4Im(h_{10}h_{11}^*)))\} - \\ \ln ch\{0.5(4Re(y_1(t)h_{01}^*) + \Delta \ln P_0(I) + (4Re(h_{10}h_{11}^*) - 4Im(h_{10}h_{11}^*)))\} \end{pmatrix} \tag{26d}$$

$$L_4 = \begin{pmatrix} \ln ch\{0.5(4Re(y_1(t)h_{01}^*) + \Delta \ln P_0(I) - (4Re(h_{10}h_{11}^*) + 4Im(h_{10}h_{11}^*)))\} - \\ \ln ch\{0.5(4Re(y_1(t)h_{01}^*) + \Delta \ln P_0(I) + (4Re(h_{10}h_{11}^*) + 4Im(h_{10}h_{11}^*)))\} \end{pmatrix} \tag{26e}$$

$$f_1 = \begin{pmatrix} \ln ch\{0.5(4Im(y_1(t)h_{01}^*) + \Delta \ln P_0(Q) - (4Re(h_{10}h_{11}^*) + 4Im(h_{10}h_{11}^*)))\} - \\ \ln ch\{0.5(4Im(y_1(t)h_{01}^*) + \Delta \ln P_0(Q) - (4Re(h_{10}h_{11}^*) - 4Im(h_{10}h_{11}^*)))\} \end{pmatrix} \tag{26f}$$

$$f_2 = \begin{pmatrix} \ln ch\{0.5(4Re(y_1(t)h_{01}^*) + \Delta \ln P_0(I) + (4Im(h_{10}h_{11}^*) + 4Re(h_{10}h_{11}^*)))\} - \\ \ln ch\{0.5(4Re(y_1(t)h_{01}^*) + \Delta \ln P_0(I) + (4Im(h_{10}h_{11}^*) - 4Re(h_{10}h_{11}^*)))\} \end{pmatrix} \tag{26g}$$

$$f_3 = \begin{pmatrix} \ln ch\{0.5(4Im(y_1(t)h_{01}^*) + \Delta \ln P_0(Q) + (4Re(h_{10}h_{11}^*) - 4Im(h_{10}h_{11}^*)))\} - \\ \ln ch\{0.5(4Im(y_1(t)h_{01}^*) + \Delta \ln P_0(Q) + (4Re(h_{10}h_{11}^*) + 4Im(h_{10}h_{11}^*)))\} \end{pmatrix} \tag{26h}$$

$$f_4 = \begin{pmatrix} \ln ch\{0.5(4Re(y_1(t)h_{01}^*) + \Delta \ln P_0(I) + (4Re(h_{10}h_{11}^*) - 4Im(h_{10}h_{11}^*)))\} - \\ \ln ch\{0.5(4Re(y_1(t)h_{01}^*) + \Delta \ln P_0(I) - (4Re(h_{10}h_{11}^*) + 4Im(h_{10}h_{11}^*)))\} \end{pmatrix} \tag{26i}$$

Here, the following new notation is introduced.

$$S_0 = Im\{k \cdot y_1 \cdot h_{10}^*\},$$
$$S_1 = Im\{k \cdot y_1 \cdot h_{11}^*\} S_2 = Re\{k \cdot y_1 \cdot h_{11}^*\},$$
$$S_3 = Re\{k \cdot y_1 \cdot h_{10}^*\}$$

$$Im\Delta E = Im(k \cdot h_{00} \cdot h_{01}^*), Re\Delta E = Re(k \cdot h_{00} \cdot h_{01}^*)$$

$$\Delta E_0 = Re\Delta E + Im + Im\Delta E, \Delta E_1 = Re\Delta E = Im\Delta E \tag{27}$$

Figure 13:
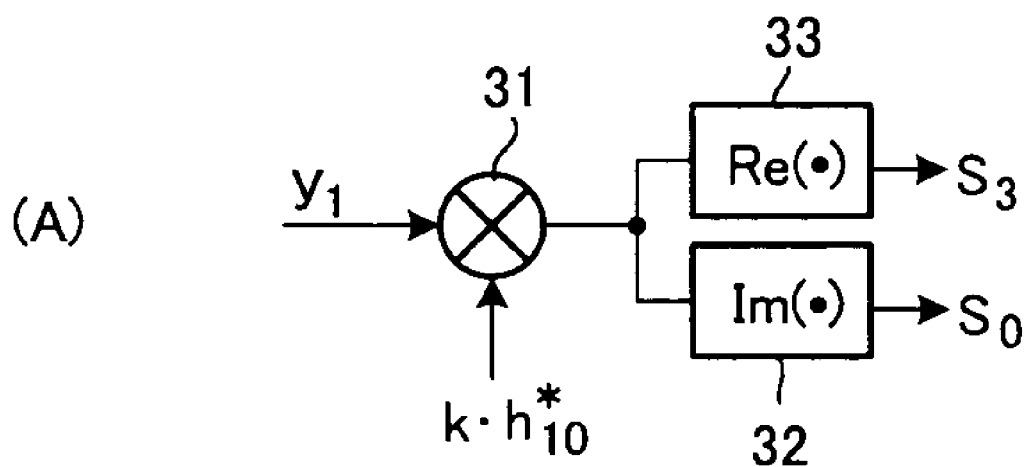
FIG. 13 shows the configuration of a fourth S0 to S4 generation portion.
Figure 13:
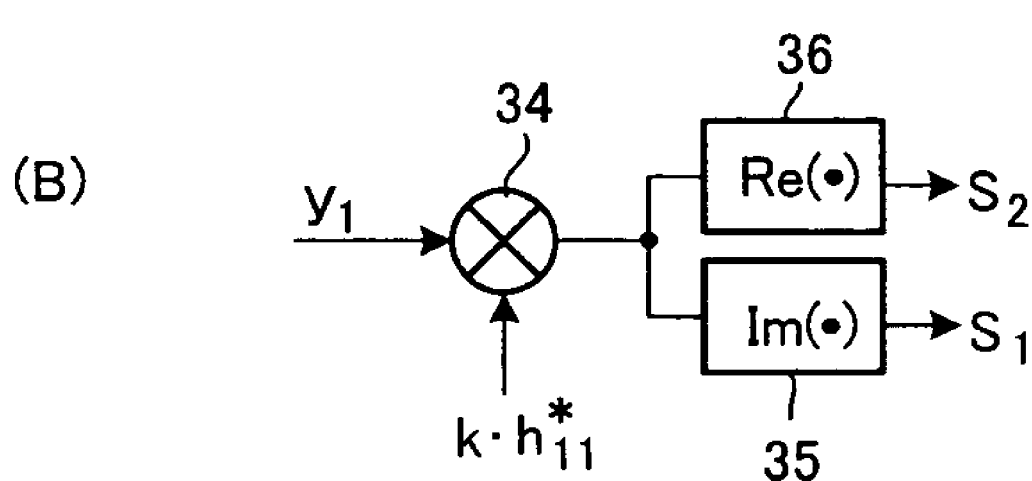

The signals S0, S3 can be calculated by the multiplier 31 which multiplies the received signal $y_1$ by $k \cdot h_{10}^*$, the imaginary part extraction portion 32 which extracts the imaginary part from the multiplication result, and the real part extraction portion 33 which extracts the real part, as shown in (A) of FIG. 13. The signals S1, S2 can be calculated by the multiplier 34 which multiplies the received signal $y_1$ by $k \cdot h_{11}^*$, the imaginary part extraction portion 35 which extracts the imaginary part of the multiplication result, and the real part extraction portion 36 which extracts the real part, as shown in (B) of FIG. 13.

Figure 14:
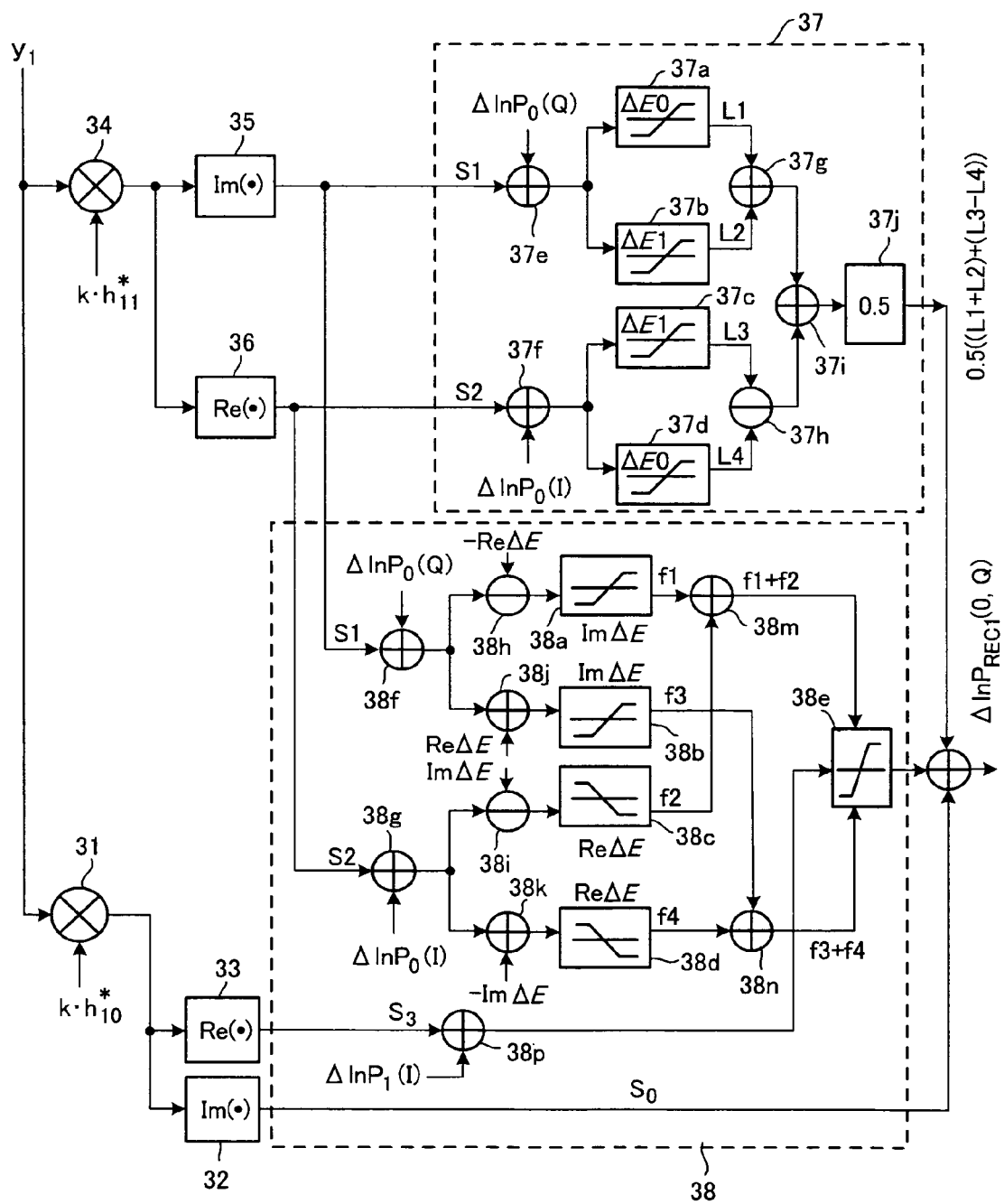
FIG. 14 shows a computation circuit which computes the difference $\Delta \ln P_{REC1}(0,Q)$ in probabilities when the imaginary part of the symbol $D_0$ is +1 and is −1 from the input signal $y_1(t)$ of the second reception device REC1.

FIG. 14 shows a computation circuit which computes $\Delta \ln P_{REC1}(0,Q)$, computing the difference $\Delta \ln P_{REC1}(0,Q)$ in probabilities when the imaginary part of the symbol $D_0$ is +1 and is −1 from the signal $y_1(t)$ input to the second receiver REC1. However, the normalization factor k is taken to be $4/N_0$ (where $N_0$ is the spectral intensity of Gaussian noise).

The computation circuit of FIG. 14 is fabricated in consideration of the notation above and the nonlinear function of equation (15); in blocks 37 and 38, 37a to 37d and 38a to 38e indicate limiters of FIG. 4 having prescribed energy differences.

Block 37 calculates the second term on the right side of equation (26a), $(L_1+L_2+L_3-L_4)$, block 38 calculates the first, third and fourth terms on the right side of equation (26a), and the adder 39 calculates and outputs $\Delta\ln P_{REC1}(0,Q)=\{\ln P(d_{Im}=+1/y(t))-\ln P(d_{Im}=-1/y(t))\}$.

In FIG. 14, it should be noted that in the blocks 37 and 38, the adders 37e, 37f, 38f, 38g add $\Delta\ln P_0(I)$ and $\Delta\ln P_0(Q)$, and the adder 38p adds $\Delta\ln P_1(I)$. $\Delta\ln P_0(I)$ is the difference in probabilities that the real part of the second symbol $D_0$ is +1 and is −1; $\Delta\ln P_0(Q)$ is the difference in probabilities that the imaginary part of the symbol $D_0$ is +1 and is −1; and when deciding the imaginary part of the first symbol $D_0$ in the second receiver REC1, the posterior estimate of the first symbol $D_0$ is used to perform refinement. Further, $\Delta\ln P_1(I)$ is the difference in probabilities that the real part of the second symbol $D_1$ is +1 and is −1, and when deciding the imaginary part of the first symbol $D_0$, the posterior estimate of the second symbol $D_1$ is used to perform refinement.

In block 37, 37g denotes a subtracter, 37h to 37i denote adders, and 37j denotes a multiplier; in block 38, 38h to 38i denote subtracters and 38j to 38p denote adders.

(h) Combination of $\Delta\ln P_{REC0}(0,Q)$ and $\Delta\ln P_{REC1}(0,Q)$

The sum of the estimate $\Delta\ln P_{REC0}(0,Q)$ and the estimate $\Delta\ln P_{REC1}(0,Q)$ obtained in the above (f) and (g) is the probability $\Delta\ln P_0(Q)$ that the imaginary part of the first symbol $D_0$ is +1 and is −1. Here, $\Delta\ln P_{REC0}(0,Q)$ is the difference in probabilities in the first receiver REC0 that the imaginary part of the first symbol $D_0$ is +1 and is −1, and $\Delta\ln P_{REC1}(0,Q)$ is the difference in probabilities in the second receiver REC1 that the imaginary part of the symbol $D_0$ is +1 and is −1.

Figure 15:
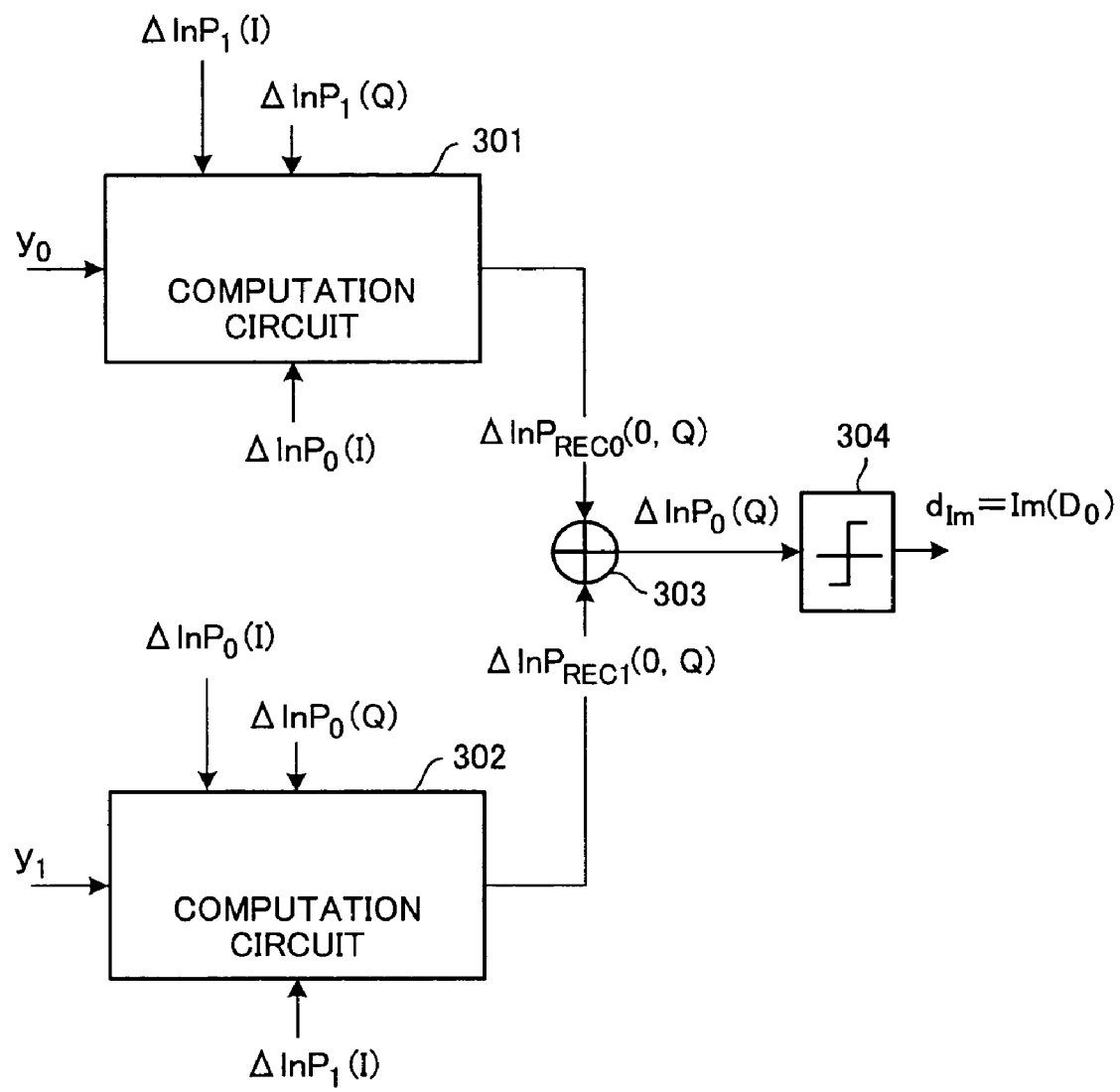
FIG. 15 shows a decision circuit for the imaginary part of the first symbol $D_0$.

FIG. 15 shows the decision circuit for the imaginary part of the first symbol $D_0$; the computation circuit 301, comprising the configuration of FIG. 12, outputs the estimate $\Delta\ln P_{REC0}(0,Q)$, the computation circuit 302, comprising the configuration of FIG. 14, outputs the estimate $\Delta\ln P_{REC1}(0,Q)$, the adder 303 adds the estimate $\Delta\ln P_{REC0}(0,Q)$ and the estimate $\Delta\ln P_{REC1}(0,Q)$ and outputs the synthesized estimate $\Delta\ln P_0(Q)$, and based on the synthesized estimate $\Delta\ln P_0(Q)$, the decision portion 304 judges whether the imaginary part of the first symbol $D_0$ is +1 or −1, and outputs the decision result $d_{Im}=\text{Im}(D_0)$.

When deciding the imaginary part of the first symbol $D_0$, the decision circuit of FIG. 15 uses the posterior estimates $\Delta\ln P_1(I)$, $\Delta\ln P_1(Q)$ of the real and imaginary parts of the second symbol $D_1$ to perform refinement, and also uses the posterior estimates $\Delta\ln P_0(I)$, $\Delta\ln P_0(Q)$ of the real and imaginary parts of the symbol $D_0$ itself to perform refinement.

(i) Decision of the Imaginary Part $d_{Im}=\text{Im}(D_1)$ of the Second Symbol $D_1$ In the above (f) through (h), decision of the imaginary part $d_{Im}=\text{Im}(D_0)$ of the first symbol $D_0$ was explained; by a similar procedure, a decision can be made for the imaginary part $d_{Im}=\text{Im}(D_1)$ of the second symbol $D_1$.

(i-1) Estimation of the Imaginary Part $d_{Im}=\text{Im}(D_1)$ of the Symbol $D_1$ Received by the First Receiver REC0

The first receiver REC0 outputs an estimate $\Delta\ln P_{REC0}(1,Q)$ of the imaginary part $d_{Im}=\text{Im}(D_1)$ of the second symbol $D_1$ according to an algorithm similar to the algorithm shown in FIG. 12. However, $$S_0=Im\{k\cdot y_0\cdot h_{01}^*\},\ S_1=Im\{k\cdot y_0\cdot h_{00}^*\}$$

$$S_2=Re\{k\cdot y_0\cdot h_{00}^*\},\ S_3=Re\{k\cdot y_0\cdot h_{01}^*\}$$

$$Im\Delta E=Im(k\cdot h_{01}\cdot h_{00}^*),\ Re\Delta E=Re(k\cdot h_{01}\cdot h_{00}^*),$$

$$\Delta E_0=Re\Delta E+Im\Delta E,\ \Delta E_1=Re\Delta E-Im\Delta E \quad (28)$$

(i-2) Estimation of the Imaginary Part $d_{Im}=\text{Im}(D_1)$ of the Symbol $D_1$ Received by the Second Receiver REC1

The second receiver REC1 outputs an estimate $\Delta\ln P_{REC1}(1,Q)$ of the imaginary part $d_{Im}=\text{Im}(D_1)$ of the second symbol $D_1$ according to an algorithm similar to the algorithm shown in FIG. 14. However, $$S_0=Im\{k\cdot y_1\cdot h_{11}^*\},\ S_1=Im\{k\cdot y_1\cdot h_{10}^*\}$$

$$S_2=Re\{k\cdot y_1\cdot h_{10}^*\},\ S_3=Re\{k\cdot y_1\cdot h_{11}^*\}$$

$$Im\Delta E=Im(k\cdot h_{11}\cdot h_{10}^*),\ Re\Delta E=Re(k\cdot h_{11}\cdot h_{10}^*),$$

$$\Delta E_0=Re\Delta E+Im\Delta E,\ \Delta E_1=Re\Delta E-Im\Delta E \quad (29)$$

The sum of the estimate $\Delta\ln P_{REC0}(1,Q)$ and the estimate $\Delta\ln P_{REC1}(1,Q)$ obtained in the above (i-1) and (i-2) is the estimate $\Delta\ln P_1(Q)$ when the real part of the second symbol $D_1$ is +1 and when it is −1. Here, $\Delta\ln P_{REC1}(1,Q)$ is the difference in probabilities when the imaginary part of the second symbol $D_1$ is +1 and when it is −1), and $\Delta\ln P_{REC1}(1,Q)$ is the difference in probabilities when the imaginary part of the second symbol $D_1$ is +1 and when it is −1).

Figure 16:
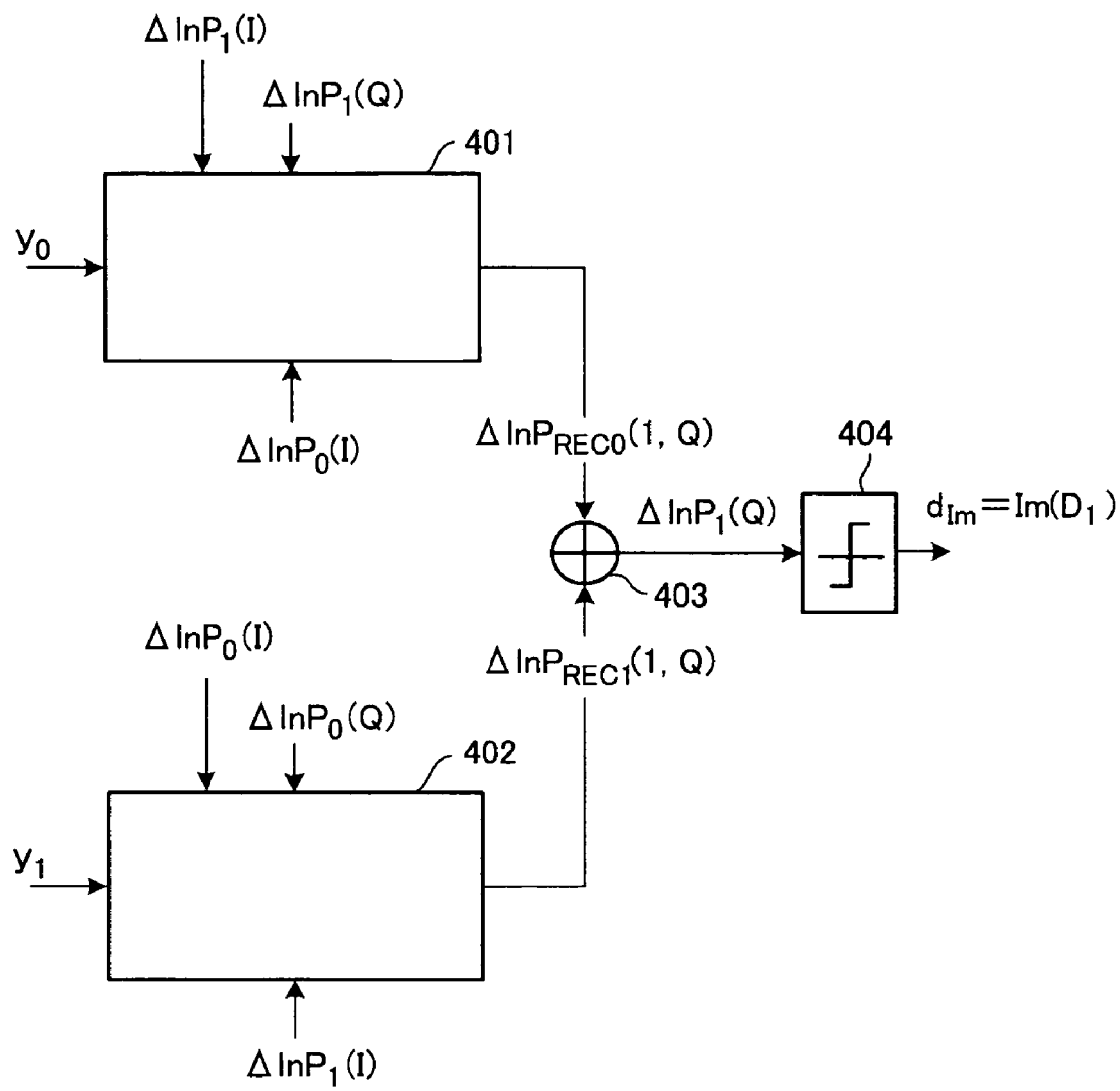
FIG. 16 shows a decision circuit for the imaginary part of the second symbol $D_1$; and, FIG. 17 shows the BER characteristic when the reception device of this invention repeats computations twice.

FIG. 16 shows the decision circuit for the imaginary part of the second symbol $D_1$; the computation circuit 401 outputs the estimate $\Delta\ln P_{REC0}(1,Q)$, the computation circuit 402 outputs the estimate $\Delta\ln P_{REC1}(1,Q)$, the adder 403 adds the estimate $\Delta\ln P_{REC0}(1,Q)$ and the estimate $\Delta\ln P_{REC1}(1,Q)$ and outputs the synthesized estimate $\Delta\ln P_1(Q)$, and based on the synthesized estimate $\Delta\ln P_1(Q)$, the decision portion 404 judges whether the imaginary part of the second symbol $D_1$ is +1 or −1, and outputs the decision result $d_{Im}=\text{Im}(D_1)$.

When deciding the imaginary part of the second symbol $D_1$, this decision circuit uses the posterior estimates $\Delta\ln P_0(I)$, $\Delta\ln P_0(Q)$ of the real and imaginary parts of the first symbol $D_0$ to perform refinement, and also uses the posterior estimates $\Delta\ln P_1(I)$, $\Delta\ln P_1(Q)$ of the real and imaginary parts of the symbol $D_1$ itself to perform refinement.

(j) BPSK Transmission

In the above, the case of QPSK transmission was explained; when using BPSK transmission, symbols comprise real parts only, and a circuit to decide imaginary parts becomes unnecessary. Further, the $\Delta\ln P_0(Q)$, $\Delta\ln P_1(Q)$ used in deciding real parts are set to 0.

(k) Simulations

Figure 17:
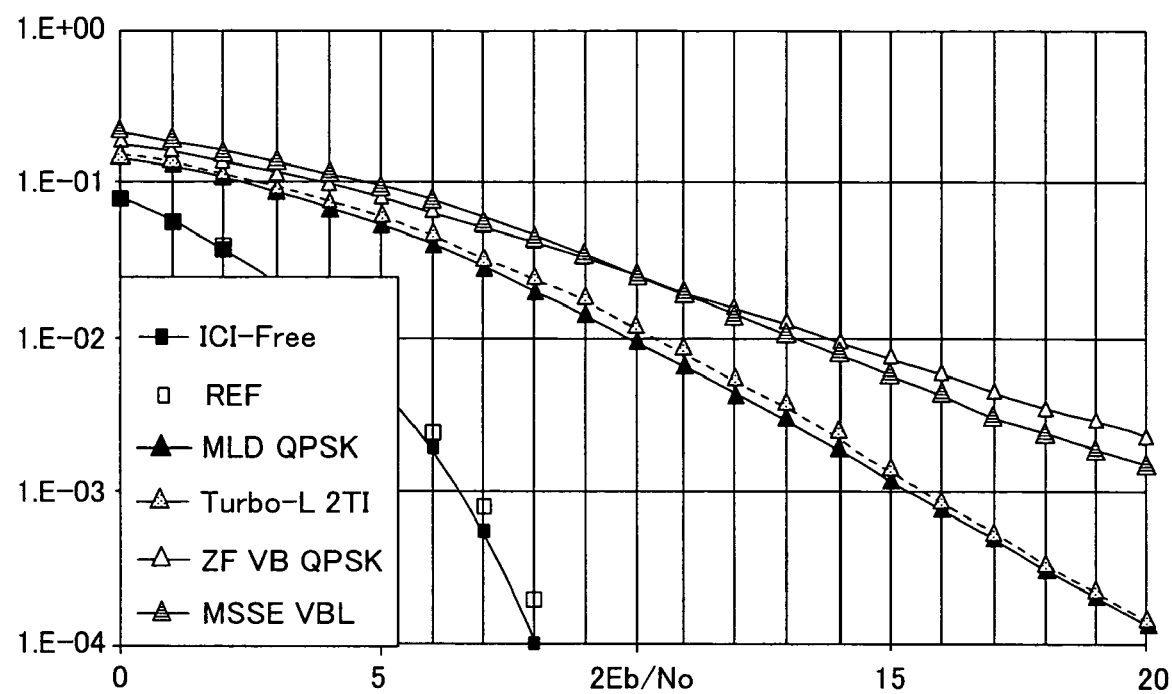

FIG. 17 shows the BER characteristic when computations for a receiver of this invention are repeated twice. For comparison, simulation results for various reception methods of the prior art (the ZF-VBL method, MSSE-VBL method, MLD method), as well as the case of no interchannel interference (ICI-free) and REF simulation results, are also shown. From the simulation results, it is seen that a satisfactory characteristic close to the BER characteristic of the MLD method is obtained for a receiver of this invention, and the SNR loss is 0.5 dB or less than the BER characteristic of the MLD method.

(m) Circuit Complexity

The low degree of complexity of the reception algorithm of this invention is explained and contrast with the MLD method, with respect to cases in which:

(1) Both of two transmitters TRX0, TRX1 adopt BPSK modulation (BPSK case);

(2) One transmitter TRX0 adopts BPSK modulation, and the other transmitter TRX1 adopts QPSK modulation (B/QPSK case); and, (3) Both of two transmitters TRX0, TRX1 adopt QPSK modulation (QPSK case).

Complexity is estimated in terms of the number of additions, subtractions, and multiplications performed for complex and for real numbers.

In the MLD method, $Q^m$ transmission vector candidates (replicas) are generated, the distance computation of equation (5) is performed, and the replica for which the distance is shortest is estimated to be the input data; the number of computations increases exponentially with the number of antennas M. However, Q [depends on] the modulation method; for BPSK, Q=2, and for QPSK, Q=4. Each Euclidean distance calculation requires four complex multiplications, two complex additions, and two complex subtractions. Moreover, according to the equation $$(a+i \cdot b) \cdot (c+i \cdot d) = a \cdot c + i \cdot a \cdot d + i \cdot b \cdot c - b \cdot d \quad (30)$$

one complex multiplication is equivalent to four real multiplications, two real additions, and one real subtraction. A complex subtraction is equivalent to two real additions/subtractions.

(1) Case of BPSK

In the MLD method, distance calculations must be performed for $2^2=4$ candidates, so that the number of computations indicated in the first row of Table 4 are necessary. The numbers in the second row of the MLD method are for the case in which real computations are substituted for complex calculations. On the other hand, in the two-repetition turbo receiver of this invention, only the number of computations indicated in the third row of Table 4 are necessary, so that the number of computations is reduced. The numbers in the fourth row for the two-repetition turbo receiver are for the case in which real computations are substituted for complex computations; compared with the MLD method, about ⅓ the number of computations are necessary.

TABLE 4

| | BPSK | | | | |
|---|---|---|---|---|---|
| | Complex Multiplication | Complex ADD | Complex SUB | Real Multiplication | Real ADD |
| MLD | 4 × 4 = 16 | 4 × 2 = 8 | 4 × 2 = 8 | 4 × 4 = 16 | 4 × 2 = 8 |
| MLD | | | | 80 | 88 |
| Turbo (2TI) | 6 | 0 | 0 | 8 | 10 |
| Turbo (2TI) | | | | 32 | 28 |

(2) Case of B/QPSK

In the MLD method, distance calculations must be performed for $2 \times 2^2 = 8$ candidates, so that the number of computations indicated in the first row of Table 5 are necessary. The numbers in the second row of the MLD method are for the case in which real computations are substituted for complex calculations. On the other hand, in the two-repetition turbo receiver of this invention, only the number of computations indicated in the third row of Table 5 are necessary, so that the number of computations is reduced. The numbers in the fourth row for the two-repetition turbo receiver are for the case in which real computations are substituted for complex computations; compared with the MLD method, the number of computations necessary is reduced.

TABLE 5

| | BPSK-QPSK | | | | |
|---|---|---|---|---|---|
| | Complex Multiplication | Complex ADD | Complex SUB | Real Multiplication | Real ADD |
| MLD | 32 | 16 | 16 | 32 | 16 |
| MLD | | | | 160 | 176 |
| Turbo (2TI) | 6 | 0 | 0 | 44 | 28 |
| Turbo (2TI) | | | | 68 | 46 |

(3) Case of QPSK

In the MLD method, distance calculations must be performed for $4^2=16$ candidates, so that the number of computations indicated in the first row of Table 6 are necessary. The numbers in the second row of the MLD method are for the case in which real computations are substituted for complex calculations. On the other hand, in the two-repetition turbo receiver of this invention, only the number of computations indicated in the third row of Table 6 are necessary, so that the number of computations is reduced. The numbers in the fourth row for the two-repetition turbo receiver are for the case in which real computations are substituted for complex computations; compared with the MLD method, the number of computations necessary is greatly reduced.

TABLE 6

| | QPSK-QPSK | | | | |
|---|---|---|---|---|---|
| | Complex Multiplication | Complex ADD | Complex SUB | Real-Multiplication | Real ADD |
| MLD | 64 | 32 | 32 | 64 | 32 |
| MLD | | | | 320 | 352 |
| Turbo (2TI) | 6 | 0 | 0 | 60 | 112 |
| Turbo (2TI) | | | | 84 | 130 |

Thus by means of this invention, the number of computations can be reduced compared with the MLD method, and moreover, a BER characteristic comparable to that of MLD methods can be obtained.

In the above embodiment, in order to simplify the explanation, the transmission station and reception station used only two antennas each, and although the constellation type adopted by transmitters was assumed to be BPSK or QPSK, this invention can be applied to an arbitrary number of transmission antennas, reception antennas, and modulation types (multivalue modulation, M-QAM).

As many apparently widely different embodiments of the present invention can be made without depending from the spirit and scope thereof, it is to be understood that the invention is not limited to the specific embodiments thereof except as defined in the appended claims.

What is claimed is:

1. A reception method, in a multiple-input-multiple-output transmission system comprising a transmitting station which transmits a first data stream and a second data stream using separate transmitting antennas and a receiving station which separates and outputs said data streams from signals received by first and second receiving antennas, the method comprising the steps of:
   computing a bit estimate value of the first data stream from signals received by the first and second antennas;

computing a bit estimate value of the second data stream from signals received by the first and second antennas;

refining the bit estimate value of the first data stream using the bit estimate value of the second data stream;

refining the bit estimate value of the second data stream using the bit estimate value of the first data stream;

repeatedly refining the bit estimate value of the first data stream using the bit estimate value of the second data stream, and repeatedly refining the bit estimate value of the second data stream using the bit estimate value of the first data stream; and after a prescribed number of repetitions, deciding bit for the first data stream based on said bit estimate value for the first data stream, and deciding bit for the second data stream based on said bit estimate value for the second data stream.

2. A reception method, in a multiple-input-multiple-output transmission system comprising a transmitting station which transmits a first data stream and a second data stream using separate transmitting antennas and a receiving station which separates and outputs said data streams from signals received by first and second receiving antennas, the method comprising the steps of:

computing a bit estimate value for the first data stream from signals received by the first antenna, computing a bit estimate value for the first data stream from signals received by the second antenna, and synthesizing these bit estimate value to obtain a synthesized estimate;

computing a bit estimate value for a second data stream from signals received by the first antenna, computing a bit estimate value for the second data stream from signals received by the second antenna, and synthesizing these bit estimate values to obtain a synthesized estimate;

refining said bit estimate values for the first data stream by said synthesized estimate value for the second data stream;

deciding bit for the first data stream based on said synthesized estimate value for the first data stream;

refining said bit estimate values of the second data stream using said synthesized estimate value for the first data stream; and deciding bit for the second data stream based on said synthesized estimate value for the second data stream.

3. The reception method in a multiple-input-multiple-output transmission system according to claim 2, further comprising the steps of:

repeatedly refining said bit estimate values for the first data stream using said synthesized estimate value for the second data stream, and repeatedly refining said bit estimate values for the second data stream using said synthesized estimate value for the first data stream; and, after a prescribed number of repetitions, deciding bit for the first data stream based on said synthesized estimate value for the first data stream, and deciding bit for the second data stream based on said synthesized estimate value for the second data stream.

4. The reception method in a multiple-input-multiple-output transmission system according to claim 2, further comprising a step of: when a transmitting station performs QPSK modulation on data and transmits the data, executing said processing for each of the real part and the imaginary part, and performing bit decisions for the real part and for the imaginary part.

5. The reception method in a multiple-input-multiple-output transmission system according to claim 4, further comprising the steps of:

refining said bit estimate values of the real part and the imaginary part of the first data stream using synthesized estimate values of the real part and the imaginary part of the second data stream; and, refining said bit estimate values of the real part and the imaginary part of the second data stream using said synthesized estimate values of said real parts and imaginary parts of the first data stream.

6. A receiver device, in a multiple-input-multiple-output transmission system comprising a transmitting station which transmits first data stream and a second data stream using separate transmitting antennas and a receiving station which separates and outputs said data streams from signals received by first and second receiving antennas, comprising:

a first computation circuit, which computes a bit estimate value of a first data stream from signals received by a first antenna;

a second computation circuit, which computes a bit estimate value of the first data stream from signals received by a second antenna;

a third computation circuit, which computes a bit estimate value of the second data stream from signals received by the first antenna;

a fourth computation circuit, which computes a bit estimate value of the second data stream from signals received by the second antenna;

a synthesis portion, which synthesizes said bit estimate values of the first data stream to obtain a synthesized estimate value;

a decision circuit, which decides bit of the first data stream based on the synthesized estimate value;

a synthesis portion, which synthesizes said bit estimate values of the second data stream to obtain a synthesized estimate value; and a decision circuit which decides bit of the second data stream based on said synthesized estimate value of said second data stream, wherein the first and second computation circuits use said synthesized estimate value of the second data stream to refine each of said bit estimate values of the first data stream, and said decision circuit decides the bit of the first data stream based on said refined synthesized estimate value of the first data stream, and the third and fourth computation circuits use said synthesized estimate value of the first data stream to refine each of said bit estimate values of the second data stream, and said decision circuit for the second data stream decides the bit of the second data stream based on said refined synthesized estimate value of the second data stream.

7. The receiver device in a multiple-input-multiple-output transmission system according to claim 6, wherein said first and second computation circuits repeatedly refine said bit estimate values of the first data stream using said synthesized estimate value of the second data stream;

the third and fourth computation circuits repeatedly refine said bit estimate values of the second data stream using said synthesized estimate value of the first data stream;

after a prescribed number of repetitions, said decision circuit for the first data stream decides bits of the first data stream based on said synthesized estimate value of the first data stream; and, after a prescribed number of repetitions, said decision circuit for the second data stream decides bits of the second data stream based on said synthesized estimate value of the second data stream.

8. The receiver device in a multiple-input-multiple-output transmission system according to claim 6, wherein, when a transmitting station performs QPSK modulation on data and transmits the data, said first to fourth computation circuits, said synthesis circuits and said decision circuits are provided for each of the real part and the imaginary part.

9. The receiver device in a multiple-input-multiple-output transmission system according to claim 6, wherein each of said computation circuits uses a nonlinear unit, having a transfer function as an amplitude limiter, to compute said bit estimate value for each data stream.

* * * * *